(12) United States Patent
    Takahama

(10) Patent No.: US 9,911,060 B2
(45) Date of Patent: Mar. 6, 2018

(54) IMAGE PROCESSING APPARATUS, IMAGE PROCESSING METHOD, AND STORAGE MEDIUM FOR REDUCING COLOR NOISE IN AN IMAGE

(71) Applicant: CANON KABUSHIKI KAISHA, Tokyo (JP)

(72) Inventor: Atsushi Takahama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 83 days.

(21) Appl. No.: 15/055,891

(22) Filed: Feb. 29, 2016

(65) Prior Publication Data

US 2016/0260199 A1  Sep. 8, 2016

(30) Foreign Application Priority Data

Mar. 3, 2015 (JP) ................................ 2015-041432
Dec. 9, 2015 (JP) ................................ 2015-240404

(51) Int. Cl.
| G06K 9/40 | (2006.01) |
| G06K 9/46 | (2006.01) |
| G06T 5/00 | (2006.01) |
| G06T 5/20 | (2006.01) |

(52) U.S. Cl.
CPC ............ *G06K 9/4661* (2013.01); *G06K 9/40* (2013.01); *G06T 5/002* (2013.01); *G06T 5/20* (2013.01); *G06T 2207/10024* (2013.01)

(58) Field of Classification Search
CPC .. G06K 9/4604; G06K 9/4652; G06K 9/4661; G06K 9/40; G06K 9/52; G06K 9/6215; G06K 2009/4666; G06T 5/002; G06T 5/20; G06T 2207/10024; G06T 5/00
See application file for complete search history.

(56) References Cited

U.S. PATENT DOCUMENTS 6,681,054 B1 * 1/2004 Gindele ................... G06K 9/40
                                                              382/254
2007/0286522 A1 * 12/2007 Moesle ................... G06T 5/003
                                                              382/274

(Continued)

FOREIGN PATENT DOCUMENTS

JP       2010-157163 A      7/2010

*Primary Examiner* — Yubin Hung
(74) *Attorney, Agent, or Firm* — Carter, DeLuca, Farrell & Schmidt, LLP

(57) ABSTRACT

Color noise is reduced while suppressing the occurrence of color blurring in the vicinity of an edge. An image processing apparatus including: a first determination unit configured to determine whether or not a first area consisting of a plurality of pixels including a pixel of interest is an area in a uniform color for the pixel of interest in input image data; a second determination unit configured to determine whether or not a second area, different from the first area, consisting of a plurality of pixels including the pixel of interest is an area in a uniform color; a setting unit configured to set a reference area consisting of the pixel of interest and adjacent pixels of the pixel of interest for the pixel of interest; and a first correction unit configured to correct the pixel value of the pixel of interest to a value for which noise has been reduced based on the pixel value of the pixel included in the reference area.

19 Claims, 17 Drawing Sheets

(56) References Cited

U.S. PATENT DOCUMENTS

| | | | |
|---|---|---|---|
| 2008/0025619 A1* | 1/2008 | Lankoande | G06K 9/0063 |
| | | | 382/232 |
| 2011/0102624 A1* | 5/2011 | Hashizume | H04N 5/3675 |
| | | | 348/222.1 |
| 2012/0033240 A1* | 2/2012 | Kim | H04N 1/58 |
| | | | 358/1.9 |
| 2014/0153817 A1* | 6/2014 | Lin | G06K 9/68 |
| | | | 382/154 |
| 2014/0240556 A1* | 8/2014 | Yahata | G06K 9/40 |
| | | | 348/241 |

* cited by examiner

PRIMARY AREA

SET OF SUB AREAS
(SECONDARY AREA)

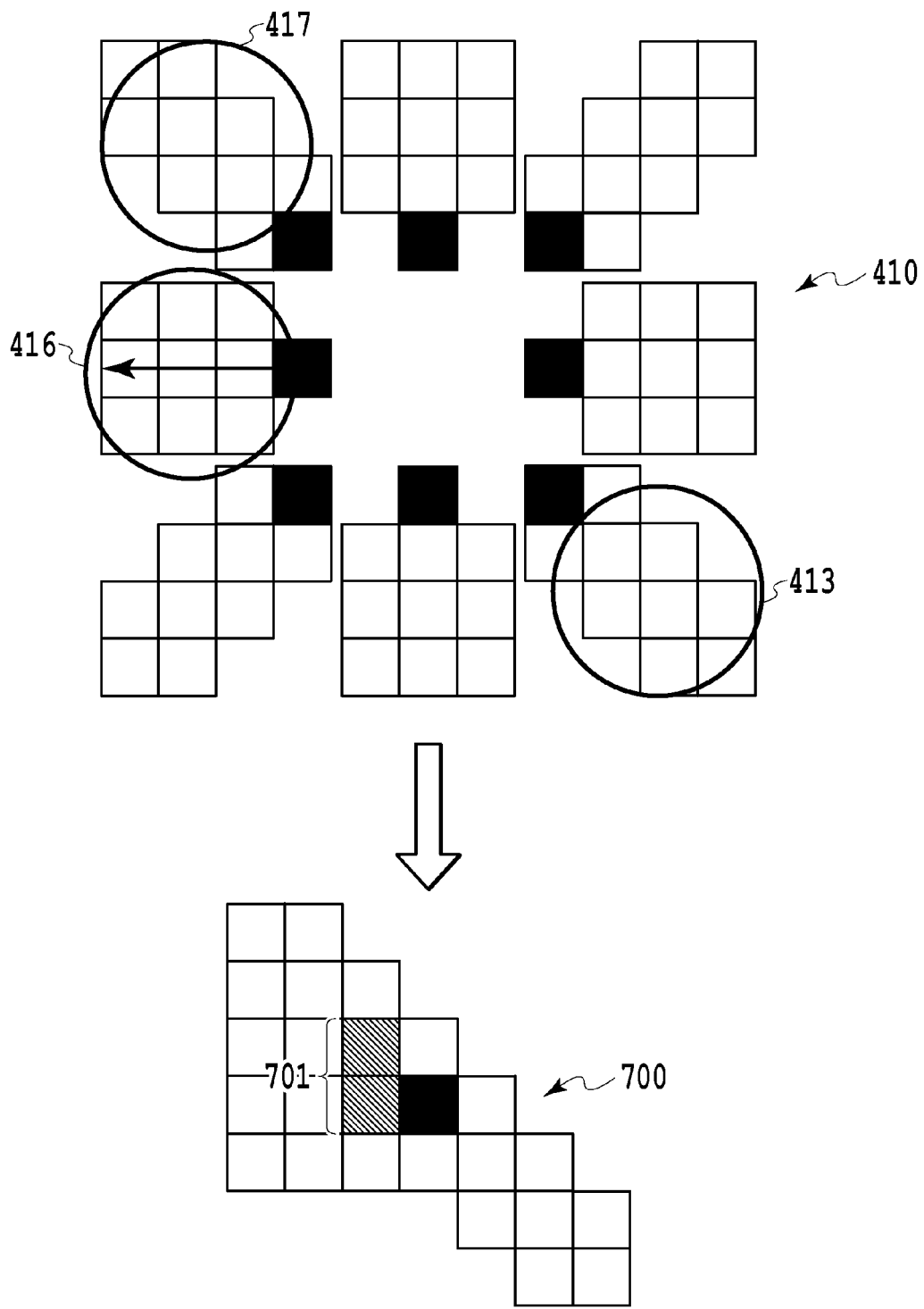
FIG.7 REFERENCE AREA

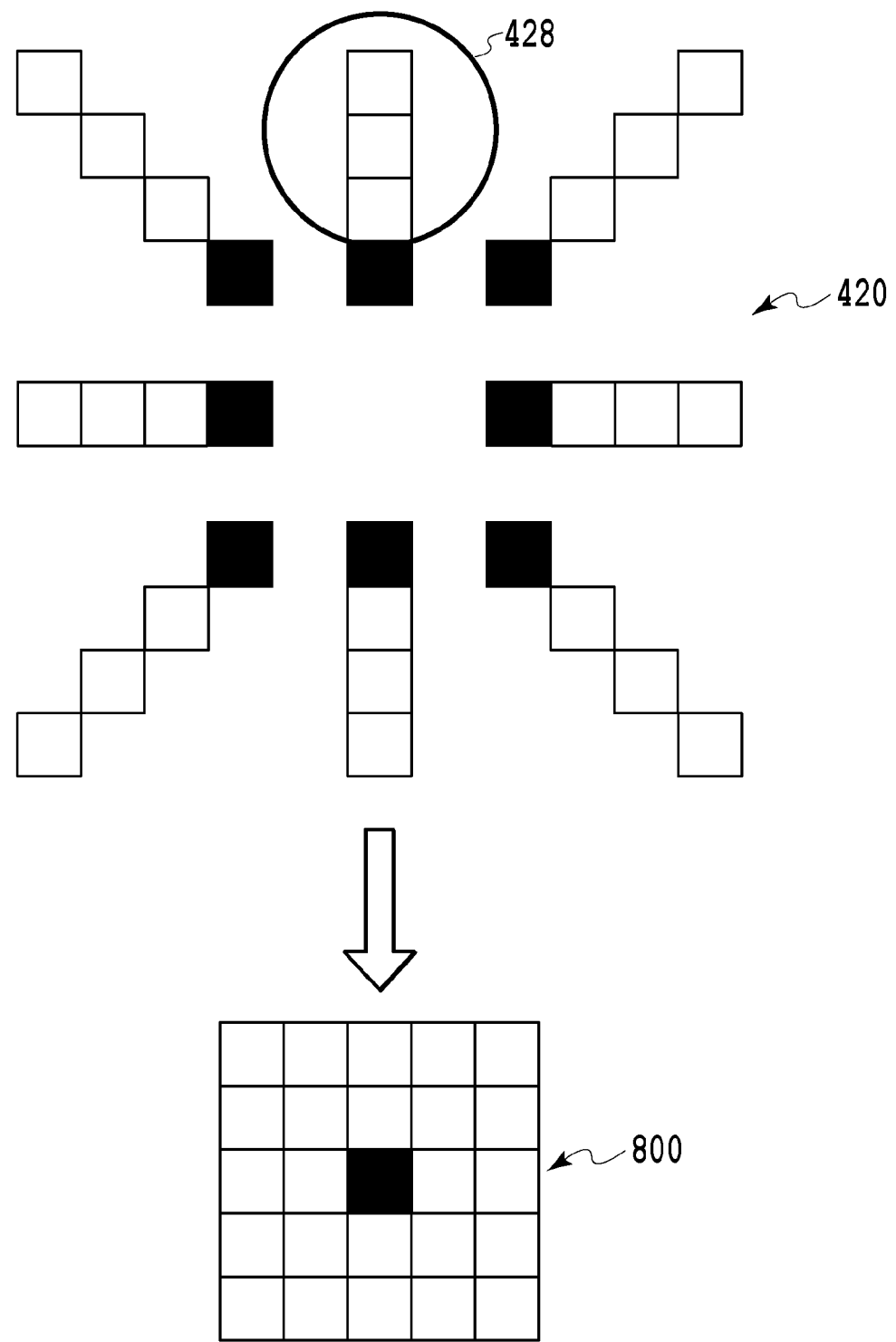
FIG.8  REFERENCE AREA

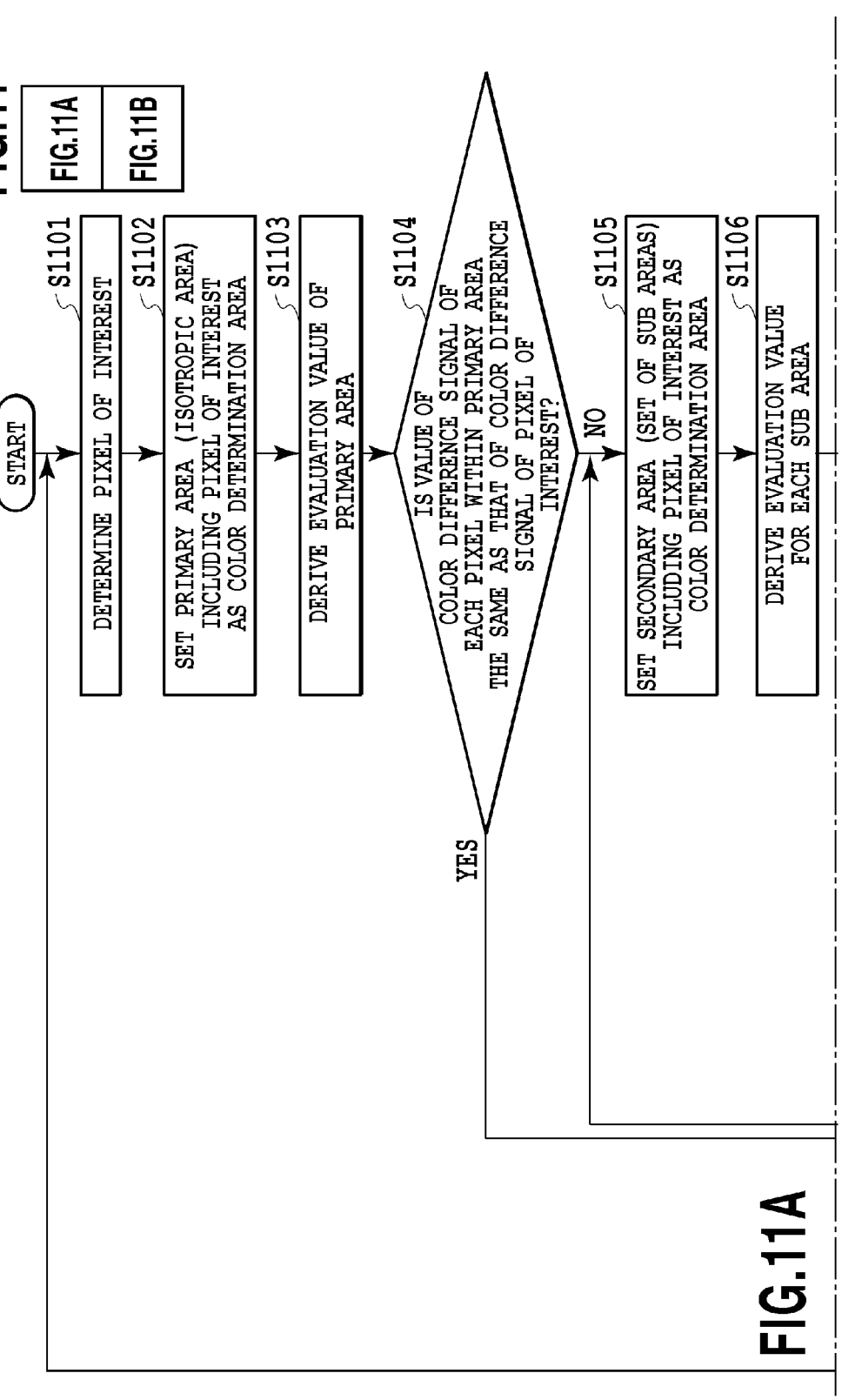

```
PIXEL VALUE OF Cr              PIXEL VALUE OF Cb
149  -34  -20  133   89        -17  -126  -35  -178  110
 27 -162 -31  175  159         -199   54  324   -150    3    -132
 96  -33  132   -20  -35   ⇒   -83  -203  -150   40  -70
-141 -62  -54    8   -3         12   -75   -72   -1    7   84
-30  -3    9    6   57         -4   -19   -12    7   84
```

```
                1  2  3  2  1
                2  3  5  3  2
                3  5  10 5  3
                2  3  5  3  2
                1  2  3  2  1
                      k
                   Dev=74
```

$$Cr_{result}(i,j) = \frac{\left(\sum_{j=-2}^{2}\sum_{i=-2}^{2}\{k(i,j)*Cr(i,j)\}\right)}{Dev}$$

$$= \frac{1\times(149)+2\times(-34)+3\times(-20)+2\times(133)+1\times(89)+2\times(27)+3\times(-162)+5\times(132)+\ldots}{74}$$

$$= 5$$

$$Cb_{result}(i,j) = \frac{\left(\sum_{j=-2}^{2}\sum_{i=-2}^{2}\{k(i,j)*Cb(i,j)\}\right)}{Dev}$$

$$= \frac{1\times(-17)+2\times(-126)+3\times(-35)+2\times(-178)+1\times(110)+2\times(-199)+3\times(54)+5\times(324)+\ldots}{74}$$

| 1 | 2 | 1 |
|---|---|---|
| 2 | 4 | 2 |
| 1 | 2 | 1 |

FIG.14

IMAGE PROCESSING APPARATUS, IMAGE PROCESSING METHOD, AND STORAGE MEDIUM FOR REDUCING COLOR NOISE IN AN IMAGE

BACKGROUND OF THE INVENTION

Field of the Invention

The present invention relates to an image processing technique to reduce color noise.

Description of the Related Art

It is known that the data of a color image captured by an image capturing device, such as a digital camera, is subjected to image processing in general after being separated into a luminance signal representing brightness and a color difference signal representing a color difference of each color component. Further, in recent years, the image capturing device, such as a digital camera, is demanded to provide an image of high quality. In particular, the request for high-sensitive photographing is strong in recent years and it is demanded to obtain an image of high quality with low noise even in a dark place or at night. However, in an environment where it is not possible to obtain a sufficient S/N ratio, such as in a dark place or at night, the noise of a color difference signal (color noise) appears as low-frequency random noise, and therefore, the image quality deteriorates.

In order to suppress the color noise, the smoothing processing using an averaging filter, a Gaussian filter, etc., or the color noise reduction processing using an order statistics filter, such as a median filter, is performed conventionally. However, in the case where the smoothing processing or the order statistics filter is used, it is necessary to design the filter so as to have a large number of taps in order to sufficiently reduce noise (low-frequency noise) in a large range, and therefore, an increase in the circuit scale will result. In view of this point, a method of obtaining the same effect without increasing the number of taps by performing filter processing after reducing an input image has been proposed (see Japanese Patent Laid-Open No. 2010-157163).

There is a case where color blurring occurs in the vicinity of an edge at the time of reducing color noise of an input image. For example, it is possible to reduce color noise in a large range by performing filter processing after reducing the input image, but color blurring will occur at the boundary of the color area due to enlargement of the reduced image. Further, also in the case where color noise is reduced without reducing the input image, it becomes more likely that color blurring occurs at the boundary portion due to the color noise reduction in a large range.

SUMMARY OF THE INVENTION

An image processing apparatus according to the present invention has: a first determination unit configured to determine whether or not a first area consisting of a plurality of pixels including a pixel of interest is an area in a uniform color for the pixel of interest in input image data; a second determination unit configured to determine whether or not a second area, different from the first area, consisting of a plurality of pixels including the pixel of interest is an area in a uniform color; a setting unit configured to set a reference area consisting of the pixel of interest and adjacent pixels of the pixel of interest for the pixel of interest; and a first correction unit configured to correct the pixel value of the pixel of interest to a value for which noise has been reduced based on the pixel value of the pixel included in the reference area, and the setting unit sets a predetermined area prepared in advance and consisting of a plurality of pixels as the reference area in the case where the first determination unit determines that the first area is an area in a uniform color, and sets an area consisting of a plurality of pixels in accordance with determination results by the second determination unit as the reference area in the case where the first determination unit determines that the first area is not an area in a uniform color.

Further features of the present invention will become apparent from the following description of exemplary embodiments (with reference to the attached drawings).

BRIEF DESCRIPTION OF THE DRAWINGS

FIG. 7 is a diagram showing the way a reference area as a correction parameter is set;

FIG. 8 is a diagram showing an example in the case where an isotropic area is set as a reference area in place of a sub area;

FIG. 12 is a diagram explaining the way a pixel value is corrected according to a second embodiment;

FIG. 14 is a schematic diagram showing an example of a filter that is used in low-pass filter processing;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
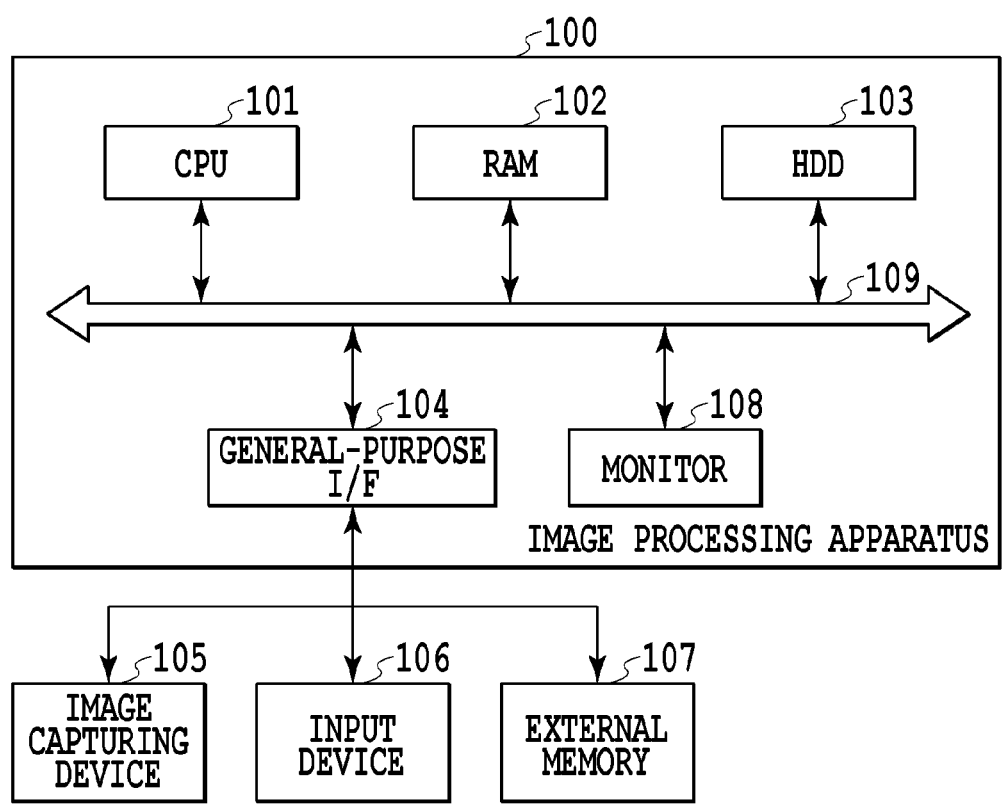
FIG. 1 is a diagram showing an example of a hardware configuration of an image processing apparatus.

FIG. 1 is a diagram showing an example of a hardware configuration of an image processing apparatus according to the present embodiment. An image processing apparatus 100 is, for example, a PC or the like and includes a CPU 101, a RAM 102, an HDD 103, a general-purpose interface (I/F) 104, a monitor 108, and a main bus 109. Then, by the general-purpose I/F 104, an image capturing device 105, such as a camera, an input device 106, such as a mouse and a keyboard, and an external memory 107, such as a memory card, are connected to the main bus 109.

The CPU 101 implements various kinds of processing as follows by causing various kinds of software (computer programs) stored in the HDD 103 to run.

First, the CPU 101 activates an image processing application that is stored in the HDD 103 and displays a user interface (UI) on the monitor 108 as well as developing the application onto the RAM 102. Subsequently, various kinds of data stored in the HDD 103 or the external memory 107, image data that is acquired by the image capturing device 105, user's instructions from the input device 106, etc., are transferred to the RAM 102. Further, in accordance with processing within the image processing application, arithmetic operation processing is performed on the data stored in the RAM 102 based on instructions from the CPU 101. The results of the arithmetic operation processing are displayed on the monitor 108, stored in the HDD 103 or the external memory 107, etc. The image data that is stored in the HDD 103 or the external memory 107 may be transferred to the RAM 102. Further, the image data that is transmitted from a server via a network, not shown, may be transferred to the RAM 102.

In the present embodiment, an aspect is explained, in which image data is input to the image processing application and image data in which color noise has been reduced is output based on instructions from the CPU 101 in the image processing apparatus 100 including the configuration as described above.

(Logic Configuration of Image Processing Apparatus)

Figure 2A:
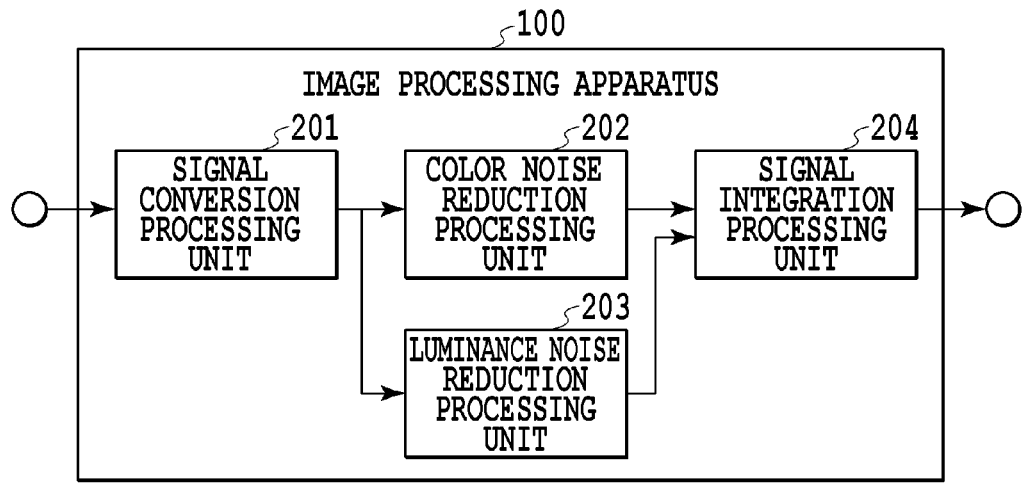
FIG. 2A is a block diagram showing an example of a logic configuration relating to noise reduction processing of an image processing apparatus according to a first embodiment and FIG. 2B is a block diagram showing an internal configuration of a color noise reduction processing unit according to the first embodiment.

FIG. 2A is a block diagram showing an example of a logic configuration relating to noise reduction processing of the image processing apparatus 100 according to the present embodiment. The image processing apparatus 100 includes a signal conversion processing unit 201, a color noise reduction processing unit 202, a luminance noise reduction processing unit 203, and a signal integration processing unit 204.

A color signal of color image data (color signal represented in an RGB color space) that is input from the image capturing device 105, the HDD 103, or the external memory 107 is first input to the signal conversion processing unit 201. The color image data that is input here may be intermediate image data that is generated in the image capturing device 105. For example, the color image data may be RAW image data, which is the original image data obtained by digitizing an image captured by an image sensing element, or RAW image data after defective pixel correction obtained by correcting a defective pixel. Further, the color image data may be RAW image data on which various kinds of correction processing, such as false color suppression, or the low-pass filter processing has been performed. In the case where color signals of RAW image data are input, it is sufficient to generate RGB color signals by using a publicly known demosaic technique. Further, in the case of RAW image data of a Bayer array, a method can be thought that handles 2×2 pixels (RGGB) as one pixel. Explanation is given on the assumption that the color image data in the present embodiment is represented in an RGB color space, but the explanation is not limited to this and it may also be possible to perform the present embodiment after converting the color image data into, for example, color image data in an L*a*b color space.

The signal conversion processing unit 201 generates a luminance signal representing a luminance component (Y) and color difference signals representing color difference components (Cr and Cb) from the RGB color signals of the input color image data by using a publicly known conversion formula. Here, the spatial frequency of the noise of the luminance signal (hereinafter, luminance noise) and the spatial frequency of the noise of the color difference signal (hereinafter, color noise) are different from each other and the spatial frequency of the noise of the color difference signal is lower. By generating YCrCb color signals from the RGB color signals relating to the input color image data by the present processing, it is possible to perform optimum noise reduction processing on the luminance signal representing the luminance component and the color difference signals representing the color difference components, respectively. The input RGB color signals and the YCrCb color signals that are generated by the signal conversion processing are sent to the color noise reduction processing unit 202 and the luminance noise reduction processing unit 203.

The color noise reduction processing unit 202 performs processing to reduce the noise of the color difference signals based on the RGB color signals and the YCrCb color signals. Details of the color noise reduction processing will be described later.

The luminance noise reduction processing unit 203 performs processing to reduce the noise of the luminance signal. It is sufficient to use common noise reduction processing for the luminance noise reduction processing unit 203.

The signal integration processing unit 204 performs processing to integrate the color signal in which color noise has been reduced by the color noise reduction processing unit 202 and the color signal in which luminance noise has been reduced by the luminance noise reduction processing unit 203. The signal integration processing unit 204 outputs color image data in which both the color noise and the luminance noise have been reduced, which is generated as the results of the signal integration processing. The color image data after the integration is output to the monitor 108, the HDD 103, etc. Further, it may also be possible to output the color image data to, for example, the external memory 107 that is connected to the general-purpose I/F 104, an external server, not shown, a printer, etc.

(Details of Color Noise Reduction Processing Unit)

Figure 2B:
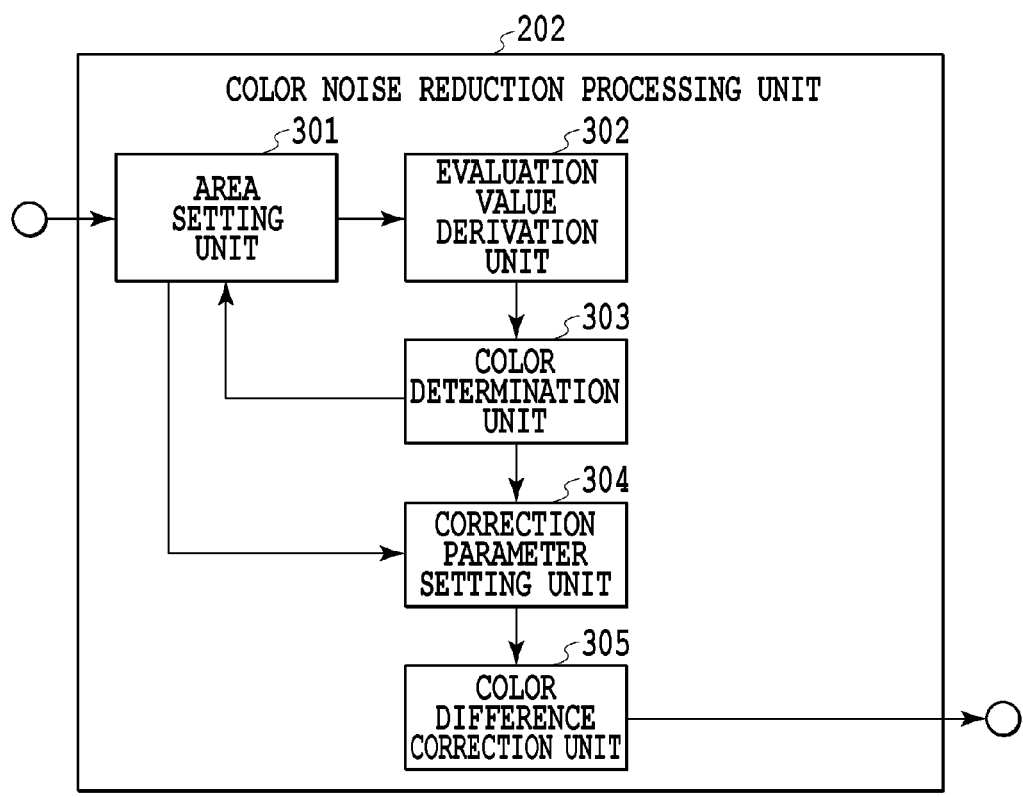

Subsequently, the color noise reduction processing unit 202 is explained in detail. FIG. 2B is a block diagram showing the internal configuration of the color noise reduction processing unit 202 according to the present embodiment. As shown in FIG. 2B, the color noise reduction processing unit 202 includes an area setting unit 301, an evaluation value derivation unit 302, a color determination unit 303, a correction parameter setting unit 304, and a color difference correction unit 305. Hereinafter, each unit of the color noise reduction processing unit 202 is explained.

<Area Setting Unit>

The area setting unit 301 sets an area (color determination area) that is the target of color determination processing by the color determination unit 303, to be described later, for each pixel of interest. The color determination area is an area consisting of a pixel of interest and a plurality of peripheral pixels of the pixel of interest in input color image data. Then, it is desirable for the color determination area not to include a pixel in a color different from the color of the pixel of interest (area in a different color) without exceeding the boundary of color (color edge) at the time of determining a reference area that is used in processing to correct a value (color difference signal) representing a color difference (hereinafter, color difference correction processing). On the other hand, it is preferable for the color determination area to include pixels as many as possible in the area, but the larger the number of pixels included in the area, the more likely that a pixel in a color different from that of the pixel of interest is included. Because of this, the color determination area is set in two stages. In other words, there exist an area that is set initially immediately after the start of processing (primary area) and an area that is set again in the case where it is determined that the primary area includes a color edge (secondary area). The primary area that is set initially is an area that is used to determine whether the color difference signal of each included pixel is substantially the same as that of the pixel of interest, and an isotropic area in which the pixel of interest is located at the center and which does not have directivity is set.

Figure 3A:
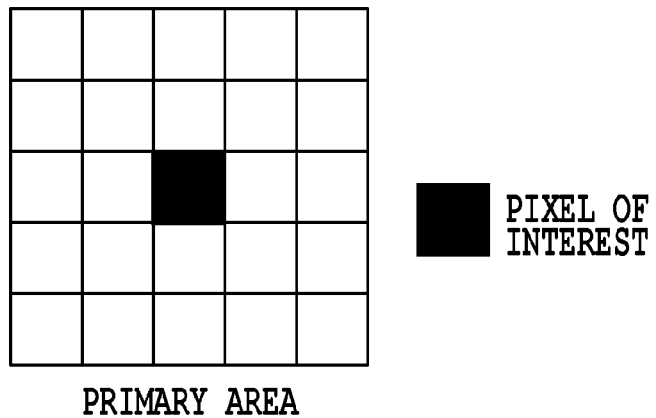
FIG. 3A is a diagram showing an example of an isotropic area of 5×5 pixels that is set as a primary area and FIG. 3B is a diagram showing an example of a set area that is set as a secondary area.

FIG. 3A is a diagram showing an example of an isotropic area of 5×5 pixels, which is set as the primary area. The size of the primary area may be fixed or the size may be set in accordance with the amount of noise of the input image. In the case where the size is set in accordance with the amount of noise, the size is set to be large for an image whose amount of noise is large and the size is set to be small for an image whose amount of noise is small. Specifically, it is sufficient to determine the size in accordance with the photographing sensitivity, but in the case where the size is set with higher accuracy, for example, the relationship between the amount of noise of the image capturing device and the ISO speed, the exposure time, and temperature is analyzed, and a table associated with the relationship therebetween is prepared in advance. Then, it is sufficient to find the amount of noise based on the above-described table by using the information, such as the ISO speed, as an input value, and to determine the primary area of the size in accordance with the amount of noise that is found.

Figure 3B:
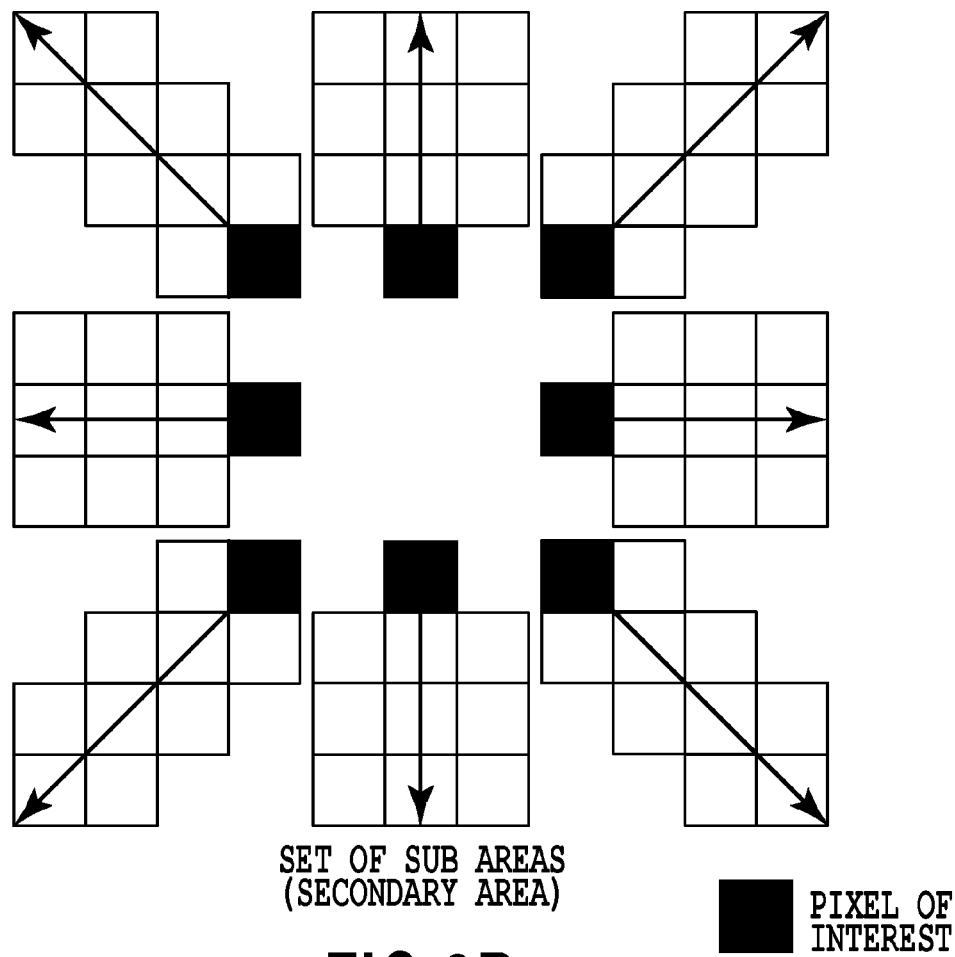

The case where the color difference signal representing each pixel that is included in the primary area is significantly different from the color difference signal of the pixel of interest (the case where a pixel in a color different from that of the pixel of interest exists in the primary area) means that a color edge exists within the vicinity of the pixel of interest. In this case, it is necessary to find an area as large as possible in which a pixel in a color different from the color of the pixel of interest is not included, without exceeding the boundary of color. Because of this, an area (hereinafter, a set area) including a combination of a plurality of areas each having directivity, and having isotropy as a whole in the case where each area is integrated, is set as the secondary area. FIG. 3B is a diagram showing an example of a set area. Each area having directivity is called a "sub area". The conditions of a set area are shown in 1) to 5) below.

1) Each sub area has spatial continuity.
2) The number of pixels in each sub area is the same.
3) The shape of each sub area has directivity with a pixel of interest being located at the center.
4) The whole of the set area in the case where each of all sub areas is combined with a pixel of interest being located at the center has isotropy.
5) The pixel of interest exists at the end in each sub area.

Figure 4:
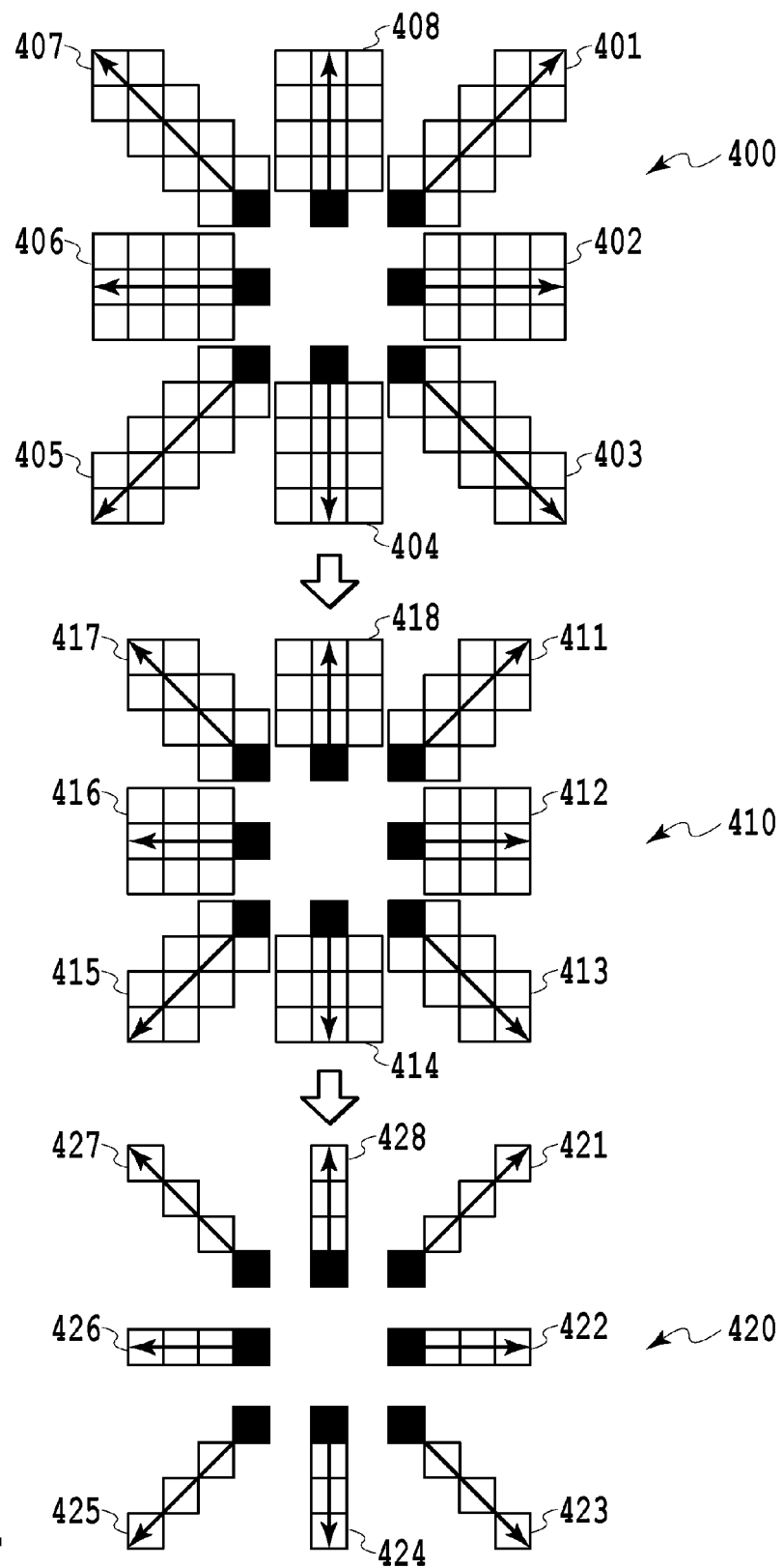
FIG. 4 is a diagram explaining the way a set area is set again.

By performing color determination processing, to be described later, based on the set area that satisfies the above-described five conditions, it is possible to find areas in various shapes in which the color difference signal having the same value as that of the color difference signal of the pixel of interest is uniform and the number of pixels is the maximum. The area in which the color difference signal is uniform means that the area consists of pixels whose color difference signal has substantially the same value as that of the color difference signal of the pixel of interest. Then, the area that is found is finally set as a reference area that is referred to in the color difference correction processing. Here, the case where the total number of sub areas is eight (eight directions) is shown, but the number of sub areas is not limited to this. Although a tradeoff with the amount of calculation is involved, it is preferable to set a set area whose resolution indirection is higher in the case where this is possible. Then, an evaluation value is derived for each sub area of the set area that is set and color determination processing is performed based on the evaluation value. As a result of this, in the case where even one sub area consisting of pixels whose color difference signal has the same value as that of the color difference signal of the pixel of interest does not exist, a new set area including sub areas whose number of pixels is decreased is set again. Details of the derivation of the evaluation value and the color determination of whether the color is the same will be described later. FIG. 4 is a diagram explaining the way a set area including sub areas whose number of pixels is reduced (number of pixels constituting each sub area is reduced) is set again in a stepwise manner. In FIG. 4, a set area 400 is a set area including eight sub areas 401 to 408 each consisting of twelve pixels (excluding the pixel of interest) and is a set area that is set first as a candidate of the secondary area. A set area 410 is a set area including eight sub areas 411 to 418 each consisting of nine pixels (excluding the pixel of interest). The set area 410 is a set area that is set again as a candidate of the secondary area in the case where even one sub area consisting of pixels whose color difference signal has the same value as that of the color difference signal of the pixel of interest does not exist in the set area 400. Then, a set area 420 is a set area including eight sub areas 421 to 428 each consisting of three pixels (excluding the pixel of interest). The set area 420 is a set area that is set further again as a candidate of the secondary area in the case where even one sub area consisting of pixels whose color difference signal has the same value as that of the color difference signal of the pixel of interest does not exist in the set area 410 that is set again. In this case, in the stage where the shape of the sub area has become a one-dimensional shape, for example, as that of the set area 420, the set area is not changed any more. It may also be possible to determine the point in time at which the set area is not set again anymore based on the number of pixels constituting each sub area (by determining whether the number of pixels is less than or equal to a predetermined number), instead of determining the point in time based on the shape of the sub area as described above, or it may also be possible to perform control based on both the shape and the number of pixels. Alternatively, it may also be possible to perform control based on the number of times the set area is set again (number of times of change).

<Evaluation Value Derivation Unit>

The evaluation value derivation unit 302 derives an evaluation value by using the color determination area (each sub area in the case where the color determination area is given as a set of a plurality of sub areas) that is set by the area setting unit 301 for the pixel of interest in the input color image data. The evaluation value is used to evaluate whether there exists a pixel in a color different from the color of the pixel of interest within the color determination area that is set. In the case where the amount of noise of the image data is large, by the method of simply comparing the color difference signal of the pixel of interest with the color difference signal of the peripheral pixel in a one-to-one manner, it is not possible to appropriately determine the difference between the color of the pixel of interest and the color of the peripheral pixel. Specifically, there is a case where it is determined that the color of both the pixels is the same despite the fact that the color difference signals of both the pixels are significantly different, or a case where it is determined that the colors of both the pixels are different despite the fact that both the pixels have the same color difference signal. In the case where the color noise reduction processing is performed on each pixel by using a pixel in a different color, color blurring will occur in the pixel in the vicinity of a color edge. Because of this, in the present embodiment, an area in the same color that includes as less pixels in colors significantly different from the color of the pixel of interest as possible is found in advance in the peripheral area of the pixel of interest, and then, the color difference correction processing is performed on the pixel of interest by referring to the pixel within the area in the same color. In the case where the area in the same color like this is found, determination is performed based on the evaluation value obtained by comparing the pixel of interest with the area consisting of a plurality pixels located on the periphery of the pixel of interest, instead of performing determination by comparing the pixel of interest with the pixel value of the reference pixel in a one-to-one manner. This determination is based on the assumption that a natural image is smooth and the same color exists continuously to a certain extent in an area other than the color edge part. Consequently, the aim of performing determination by using an area consisting of a plurality of pixels is to improve determination accuracy. It is possible to find the evaluation value of an area by, for example, expression (1) below.

$$\sigma'^2 = \frac{1}{N-1} \sum_{i=1}^{N} (x_i - u)^2 \qquad \text{Expression (1)}$$

In expression (1) described above, N represents the number of pixels constituting the area and $x_1$ represents the pixel value of each pixel constituting the area. Further, u is the pixel value of the pixel of interest. Here, the image data that is input is color image data, and therefore, the evaluation value is derived for each color of RGB. A difference in the pixel value between corresponding pixels is calculated for the pixel of interest and each area that is set for the reference area. The evaluation value is determined based on the value obtaining by adding all the differences in the pixel value in the area. The evaluation value is larger in the case where the number of pixels in colors significantly different from the color of the pixel of interest on the basis of the color of the pixel of interest is larger. Consequently, a large evaluation value means that the area is not an area in the same color including the color components of the pixel of interest (possibility that a color edge is included is strong). In the case of a small evaluation value, the change in color within the area is slight and the area is determined to be an area in a uniform color. In particular, it is possible to predict that the area whose evaluation value calculated by expression (1) is small is an area including the same color components as the color components representing the pixel value of the pixel of interest.

Figure 5:
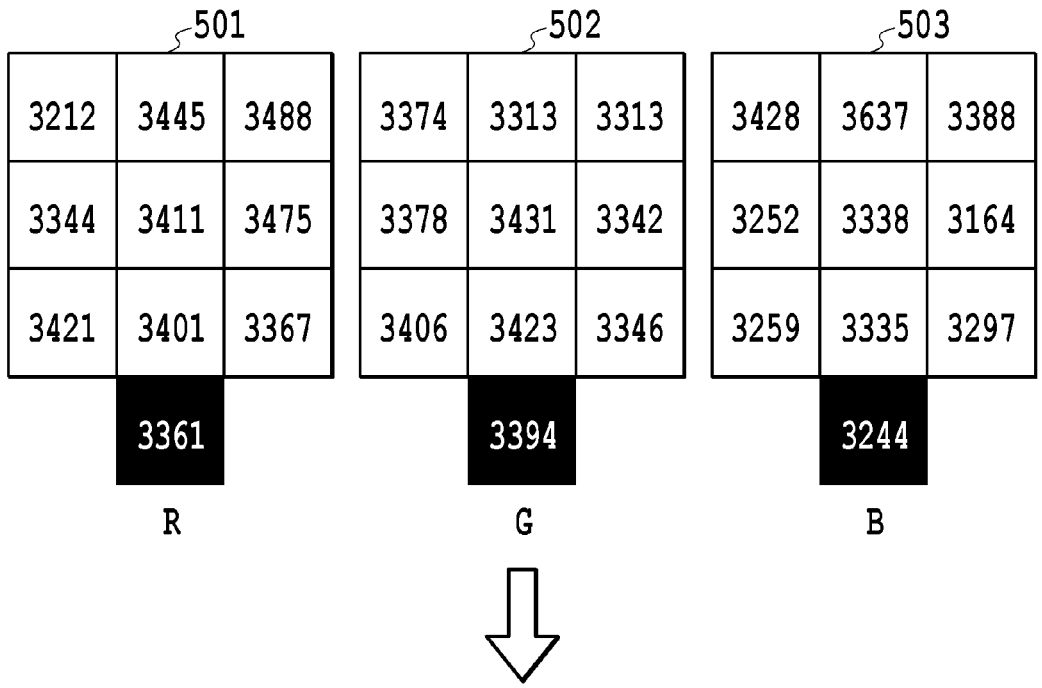
FIG. 5 is a specific example of an evaluation value.

FIG. 5 shows specific examples of evaluation values that are derived in the case where the area to be processed is the sub area 418 (N=10) shown in FIG. 4. In the example in FIG. 5, each of RGB has pixel values (14 bits: 0 to 16384) indicated by reference symbols 501 to 503, respectively. In this case, for example, an arithmetic operation as indicated by reference symbol 504 is performed for the sub area of the G components 502. The same arithmetic operation is performed for the R components and the B components, and the evaluation values indicated by reference symbol 505 are derived finally for each component of RGB.

As a matter of course, the image data may be RAW data before demosaicking. At this time, in the case of RAW data whose image is captured by, for example, a color filter of a Bayer array system, it may also be possible to regard a signal obtained by averaging G1 and G2 as G.

The expression to find an evaluation value is not limited to expression (1) described above and, for example, it may also be possible to take a value obtained by using expression (2) below to be an evaluation value.

$$\sigma' = \frac{1}{N-1} \sum_{i=1}^{N} |x_i - u| \qquad \text{Expression (2)}$$

As above, the evaluation value used to evaluate whether an area is an area in the same color including the color components of the pixel of interest may be any value that is determined based on a difference between the pixel value of the pixel of interest and the pixel value within a predetermined area. Consequently, the evaluation value is not limited to the value that is obtained by expression (1) or expression (2) described above. For example, it may also be possible to take a difference between the pixel value of the pixel of interest and an average value of the pixel values within the area to be an evaluation value. The derived evaluation value is stored in the RAM 102 so as to be used in the next color determination processing.

<Color Determination Unit>

The color determination unit 303 performs color determination processing to determine whether the area that is set by the area setting unit 301 (the primary area or the secondary area) is an area consisting of pixels whose color difference signal has the same value as that of the color difference signal of the pixel of interest based on the evaluation value derived by the evaluation value derivation unit 302. In the case where the color determination area is the secondary area (the set of a plurality of sub areas), whether a condition is satisfied is determined for each sub area. For example, in the case where the evaluation values of RGB that are derived by using expression (1) described above are taken to be $\sigma'^2_R$, $\sigma'^2_G$, and $\sigma'^2_B$, respectively, on a condition that a condition expressed by expression (3) below is satisfied, it is determined that the area is an area in the same color as a result.

$$(\sigma'^2_R < th_R) \wedge (\sigma'^2_G < th_G) \wedge (\sigma'^2_B < th_B) \qquad \text{Expression (3)}$$

In expression (3) described above, "Λ" represents a logical product (AND) (this applies in the following) and "th" is a predetermined threshold value that satisfies expression (4) below. In other words, the case where it is determined that the evaluation value is less than or equal to a predetermined threshold value for all the color components of RGB means that it is determined that the color of the area is substantially the same as the color of the pixel of interest and an area in a different color is not included.

$$th = uc + \text{offset} \quad \text{Expression (4)}$$

In expression (4) described above, u is the pixel value of the pixel of interest, c is a coefficient, and offset is a constant. Here, it is preferable to change the coefficient c in accordance with the amount of noise of image data. For example, the coefficient c is set in advance in accordance with the photographing sensitivity or the like of the image capturing device so that a small value is set as the coefficient c in the case where the amount of noise is small and a large value is set in the case where the amount of noise is large. In the present embodiment, a value common to RGB is set as the coefficient c. However, it may also be possible to set different values as the coefficient c for different colors. For example, the coefficient c corresponding to G is set to a value smaller than values of the coefficients c corresponding to the other two colors. In the case where small values are used uniformly as the coefficients c for all the color components, the number of pixels that satisfy conditional expression (3) becomes smaller, and therefore, the color noise reduction processing effect is lessened. Consequently, by setting a severe condition for the color component G whose S/N ratio is good compared to that of the other two colors, it is possible to calculate an evaluation value with higher accuracy, and therefore, to effectively implement the color noise reduction processing. Further, it is preferable to determine the constant offset based on the amount of noise of a dark part. For example, the constant offset is set in advance in accordance with the photographing condition or the like of the image capturing device so that a small value is set as the constant offset in the case where the amount of noise of a dark part is small and a large value is set in the case where the amount of noise of a dark part is large. The constant offset may not be used (i.e., even offset=0 can be set), but by appropriately setting the value of offset particularly in the case where the amount of noise of a dark part is large, such as the case of high-sensitivity long-time exposure photographing, it is made possible to obtain color determination results with higher accuracy.

Figure 6A:
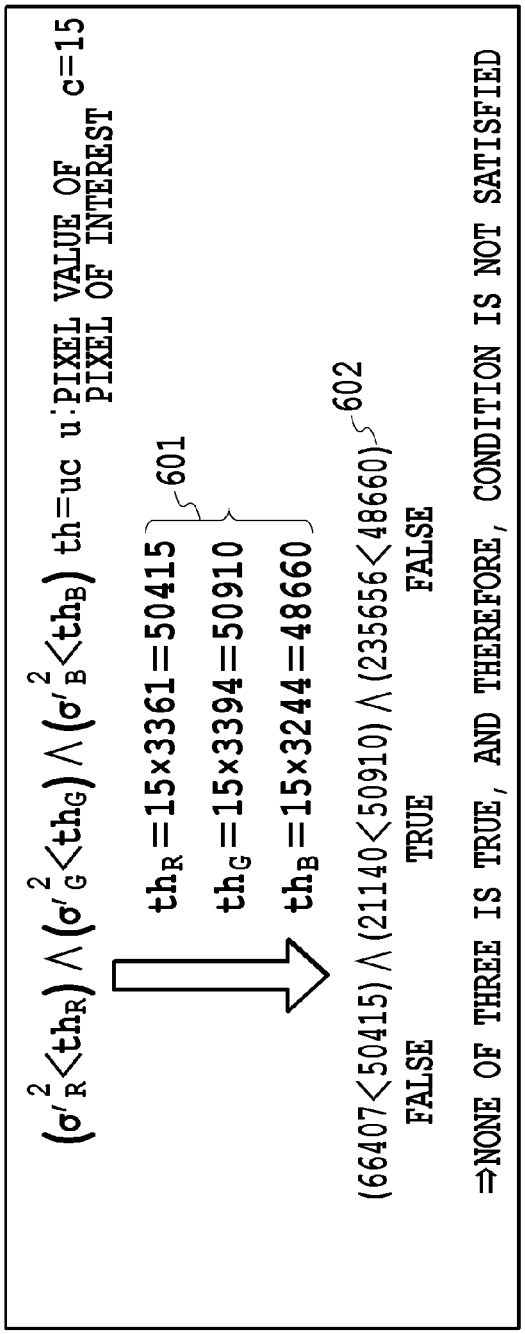
FIG. 6A is a specific example of color determination results and FIG. 6B is a specific example in which an area whose total value score is the minimum is found.

FIG. 6A shows the results of performing color determination by using expression (3) described above based on the specific examples of the evaluation values shown in FIG. 5. In the example in FIG. 6A, the threshold values th are given respectively as indicated by reference symbol 601 in the case where the pixel values of the respective pixels of interest are (R: 3361, G: 3394, B: 3244) and the coefficient c=15. The respective evaluation values ($\sigma'^2_R$: 66407, $\sigma'^2_G$: 21140, $\sigma'^2_B$: 235656) of respective RGB indicated by reference symbol 505 are substituted in expression (3) described above. As a result of this, the determination results (the condition is not satisfied, and therefore, the area is not an area in the same color as that of the pixel of interest) indicated by reference symbol 602 are obtained.

The determination expression in the case where the evaluation values are derived by using expression (2) will be as expression (5) below.

$$(\sigma'_R < th'_R) \wedge (\sigma'_G < th'_G) \wedge (\sigma'_B < th'_B) \quad \text{Expression (5)}$$

Then, th' in expression (5) described above is defined by expression (6) below.

$$th' = \sqrt{uc} + \text{offset'} \quad \text{Expression (6)}$$

In the case where the color determination area is the secondary area, on a condition that the determination condition in expression (3) or expression (5) is satisfied in at least one or more sub areas among the plurality of sub areas included in the set area, the sub area having the minimum evaluation value and the direction thereof among the sub areas that satisfy the determination condition are found. For this purpose, a total value score of the evaluation value of each color is further found for the sub areas that satisfy the determination condition. The total value score is found by using expression (7) below in the case where the evaluation values are derived by using expression (1), and by using expression (8) below in the case where the evaluation values are derived by using expression (2).

$$\text{score} = \sigma'^2_R + \sigma'^2_G + \sigma'^2_B \quad \text{Expression (7)}$$

$$\text{score} = \sigma'_R + \sigma'_G + \sigma'_B \quad \text{Expression (8)}$$

Then, the area for which the total value score that is found is the minimum is found by using expression (9) below.

$$\text{Min}\{\text{score}|\text{score} \in S\} \quad \text{Expression (9)}$$

In expression (9) described above, S is a set of the total value score of each area that satisfies the determination condition in expression (3) or expression (5).

Figure 6B:
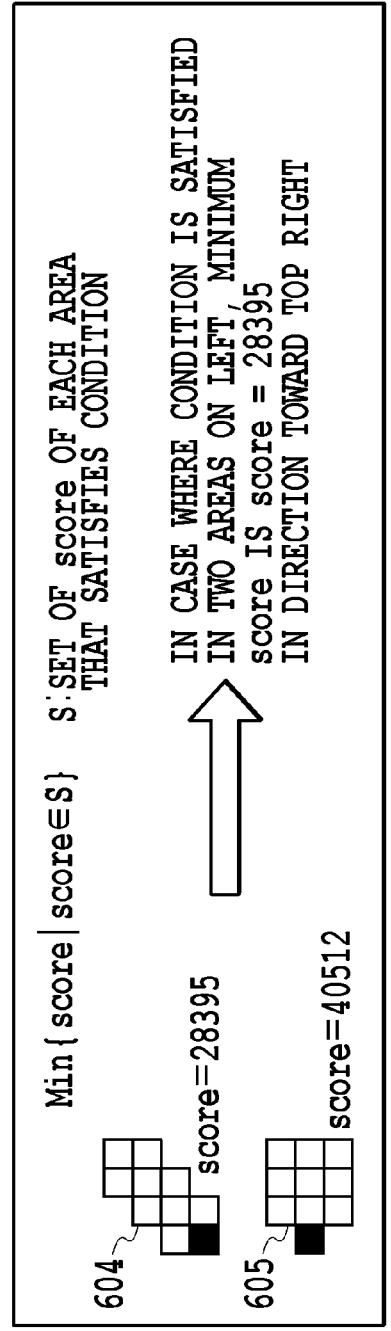

FIG. 6B shows the way the area for which the total value score is the minimum is found. In the example in FIG. 6B, two areas, i.e., a sub area 604 having directivity in the direction toward the top right and a sub area 605 having directivity in the direction toward the right are determined to be the areas in the same color as that of the pixel of interest. The sub area 604 in the direction toward the top right for which the value of the total value score is smaller among the sub areas determined to be the areas in the same color is found as the sub area having the minimum evaluation value.

The results of the color determination processing obtained as described above are stored in the RAM 102 so as to be used by the correction parameter setting unit 304 next.

<Correction Parameter Setting Unit>

The correction parameter setting unit 304 sets a parameter that is used in processing to correct a color difference in order to reduce color noise (color difference correction processing). The correction parameter in the present embodiment is information on a reference area that is used in the color difference correction processing for the pixel of interest. The correction parameter setting unit 304 determines the area that is determined to satisfy the determination condition by the color determination unit 303 to be a reference area that is used in the color difference correction processing for the pixel of interest. FIG. 7 is a diagram showing the way the reference area as the correction parameter is set in the case where the secondary area (set area) is set as the color determination area. In the example in FIG. 7, the sub areas 413, 416, and 417 each enclosed by a circle among the eight sub areas 411 to 418 of the set area 410 shown in FIG. 4 satisfy the determination condition. As a result of this, it is shown that a reference area 700 that uses all these three sub areas is set as the correction parameter. In the example in FIG. 7, the three sub areas overlap at three pixels in total, i.e., two pixels 701 indicated by slashes, at which the sub area 416 and the sub area 417 overlap, and the pixel of interest indicated by a black square. In the case where pixels overlap such as this, it may also be possible to set the reference area by calculating the sum-set (union) of each sub area or to regard that the reference areas exist in the number of pixels that overlap. The latter case means that the weight of the pixels that overlap becomes greater in the color difference correction processing.

Further, in the case where the primary area (isotropic area) that is set as the color determination area satisfies the determination condition, in the present embodiment, the primary area is set as it is as the reference area. However, it may also be possible to set an area different from the primary area. The reason is that, as to the pixel for which it has already been determined that there is no color edge therearound, it is predicted that the noise reduction effect can be obtained, of course, by the noise reduction processing using the primary area, and besides that, by the noise reduction processing using a different area or another noise reduction processing. Consequently, as to the pixel for which it has been determined that there is no color edge therearound by the color determination using the primary area, it is sufficient to design the noise reduction processing by taking into consideration the processing speed and the circuit cost.

In the present embodiment, there may be a case where the results of the color determination processing performed on the secondary area indicate that there is not a sub area that satisfies the determination condition, or where the total number of pixels in the sub area that satisfies the determination condition is less than or equal to a predetermined number (e.g., five pixels). In this case, an isotropic area in which the pixel of interest is located at the center and the size of which is greater than or equal to that of the primary area is set as the reference area. It is known that the sufficient noise reduction effect is not obtained in the case where the reference area that is used in the noise reduction processing is constituted by a small number of pixels. Because of this, here, in the case where it is not possible to find an appropriate area as the reference area by the color determination processing in the primary area or by the color determination processing in the secondary area, priority is given to the noise reduction effect by performing the noise reduction processing using a larger number of pixels. FIG. 8 shows an example in which an isotropic area 800 of 5×5 pixels is set as the reference area in place of the sub area 428 because the area that satisfies the determination condition is only the sub area 428 and the total number of pixels is four, which is less than five, the predetermined number. At this time, it may also be possible to change the contents of the color difference correction processing. An aspect in which the contents of the color difference correction processing will be explained in a second embodiment.

The correction parameter (information on the reference area for each pixel of interest) that is set as described above is stored in the RAM 102 so as to be used in the color difference correction unit 305 next.

<Color Difference Correction Unit>

The color difference correction unit 305 performs processing to correct a value representing a color difference so as to reduce color noise on input color image data based on the correction parameter that is set. In the present embodiment, the contents of the color difference correction processing in the case where the reference area that is set is the primary area are made to differ from the contents of the color difference correction processing in the case where the reference area that is set is the secondary area.

First, the case where the reference area is the secondary area (set area) is explained. In the case where the reference area is the secondary area, signals Cr and Cb each representing a color difference in the pixel of interest are corrected by using expression (10) and expression (11) below.

$$Cr_{result} = \frac{\sum Cr[i]}{M} \quad \text{Expression (10)}$$

$$Cb_{result} = \frac{\sum Cb[i]}{M} \quad \text{Expression (11)}$$

In expression (10) and expression (11) described above, Cr [i] and Cb [i] each represent a pixel that satisfies expression (12) below within the reference area for the pixel of interest. M is the number of pixels that satisfy expression (12) below in the reference area for the pixel of interest. The pixel of interest itself is included without exception, and therefore, M≥1 holds.

$$(Y_{diff} <= Th_Y) \wedge (Cr_{diff} <= Th_{Cr}) \wedge (Cb_{diff} <= Th_{Cb}) \quad \text{Expression (12)}$$

In expression (12) described above, $Th_Y$ represents a threshold value for luminance, $Th_{Cr}$ represents a threshold value for the color difference Cr, and $Th_{Cb}$, represents a threshold value for the color difference Cb, respectively. Then, $Y_{diff}$, $Cr_{diff}$, and $Cb_{diff}$ each represent a difference between each pixel value within the reference area and the pixel value to be compared and are expressed by expression (13) to expression (15) below, respectively. However, in the case where the pixel of interest is achromatic, it is not necessary to take into consideration the luminance Y in expression (12) described above.

$$Y_{diff} = |Y_i - Y_{comp}| \quad \text{Expression (13)}$$

$$Cr_{diff} = |Cr_i - Cr_{comp}| \quad \text{Expression (14)}$$

$$Cb_{diff} = |Cb_i - Cb_{comp}| \quad \text{Expression (15)}$$

It is sufficient to use the pixel value of the pixel of interest as pixel values $Y_{comp}$, $Cr_{comp}$, and $Cb_{comp}$ to be compared in expression (13) to expression (15) described above. However, in the case where the pixel value of the pixel of interest is significantly different from the true value due to noise, there is a possibility that an appropriate sum of pixels will not be obtained or a large bias will occur. Because of this, it may also be possible to take a value as the pixel value of the pixel of interest, which is obtained as the results of applying a low-pass filter to the pixel of interest and adjacent pixels thereof in the direction of the sub area having the minimum evaluation value that is found by the color determination unit 303. Alternatively, it may also be possible to take a value as the pixel value of the pixel of interest, which is obtained as the results of averaging pixel values of the pixel of interest and one or more adjacent pixels other than the pixel of interest included in the sub area having the minimum evaluation value that is found by the color determination unit 303.

Figure 9:
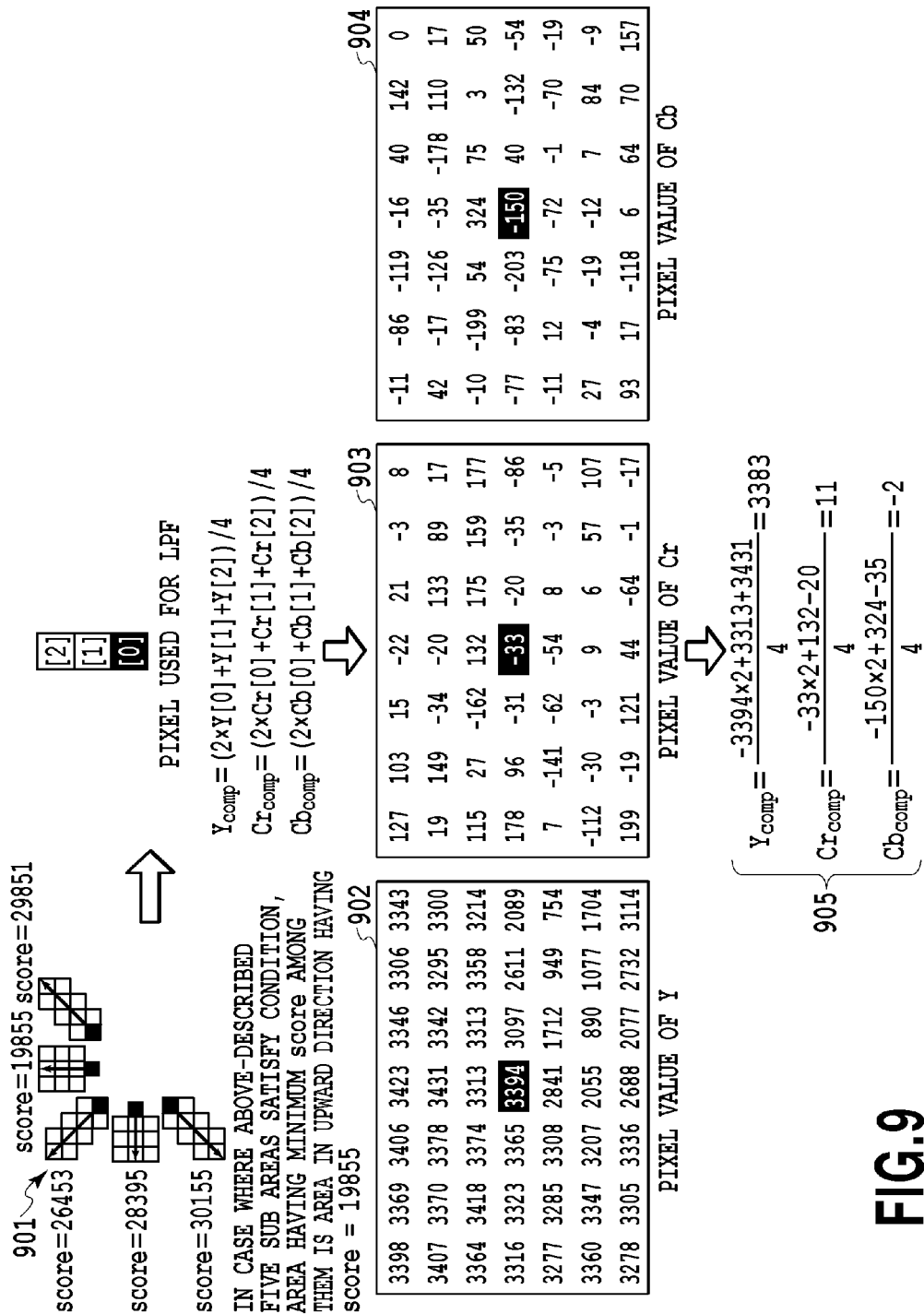
FIG. 9 is a diagram showing a specific example in which a pixel value to which a low-pass filter has been applied is derived based on a sub area having the minimum evaluation value and the direction thereof.

Here, a specific example of the color difference correction processing is explained with reference to FIG. 9 and FIG. 10. First, FIG. 9 shows a specific example in which values (pixel values to be compared) that are calculated by using a low-pass filter are derived based on the sub area having the minimum evaluation value and the direction thereof. In the example in FIG. 9, among five sub areas that satisfy the condition, a sub area 901 having score=19855 and directivity in the upward direction is the sub area having the minimum evaluation value. As a result of this, a low-pass filter is applied to the sub area 901 having directivity in the upward direction by using the pixel of interest and two adjacent pixels neighboring in the upward direction in the image data having pixel values (14 bits: 0 to 16384) indicated by reference symbols 902 to 904. As the results of the arithmetic operation using a low-pass filter, the pixel values ($Y_{comp}$: 3383, $Cr_{comp}$: 11, $Cb_{comp}$: −2) to be compared, which are indicated by reference symbol 905, are calculated.

Figure 10:
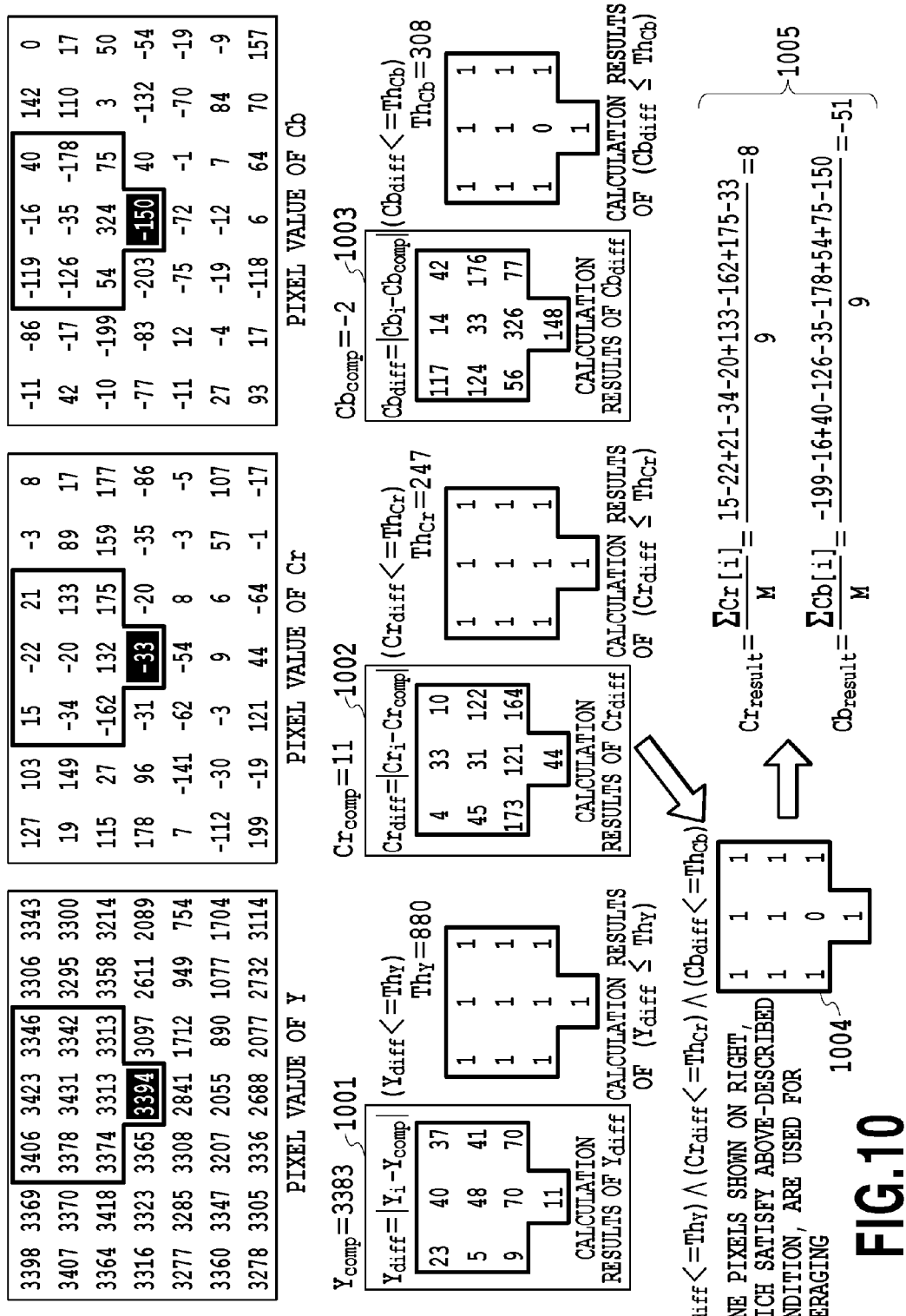
FIG. 10 is a diagram explaining the way a pixel value is corrected according to the first embodiment.

Then, FIG. 10 is a diagram explaining the way the pixel values are corrected by expression (10) to expression (12) described above. Here, for simplification of explanation, explanation is given on the assumption that only the sub area 901 having directivity in the upward direction is determined to be the area that satisfies the condition (area in the same color as that of the pixel of interest) and only this area is set as the reference area. It is also assumed that the image data having the pixel values (14 bits: 0 to 16384) indicated by reference symbols 902 to 904 shown in FIG. 9 is the target of correction and that the reference area at the time of correction is the area indicated by a thick frame.

Here, $Y_{diff}$, $Cr_{diff}$, and $Cb_{diff}$ indicated by reference symbols 1001 to 1003 are derived first by using the pixel values ($Y_{comp}$: 3383, $Cr_{comp}$: 11, $Cb_{comp}$: −2) to be compared, which are indicated by reference symbol 905 in FIG. 9. Then, the derived $Y_{diff}$, $Cr_{diff}$, and $Cb_{diff}$ are substituted in expression (12) described above and all nine pixels having a value of "1", which are indicated by reference symbol 1004, are determined to be pixels that are used in averaging in expression (10) and expression (11) described above. Then, corrected values ($Cr_{result}$: 8, $Cb_{result}$: −51) of the values Cr and Cb each representing the color difference in the pixel of interest, which are indicated by reference symbol 1005, are derived finally.

In the present embodiment, the example in which a low-pass filter is used is explained, but in the case where the same effect is obtained, it may also be possible to freely determine the weighting and the number of neighboring pixels that are used. Of course, it may also be possible to make use of an average value of pixels within the reference area. Because a human being has spectral sensitivity characteristics that green light is felt the brightest, it may also be possible to handle the G component as simplified luminance in place of the luminance Y. Consequently, it may also be possible to find the value Cr representing the color difference by subtracting the G component from the R component and the value Cb by subtracting the G component from the B component.

Next, the case where the reference area is the primary area (single isotropic area) is explained. In the case where the reference area is the primary area, for example, smoothing processing using an averaging filter is performed on the pixel of interest as color difference correction processing.

The color image data in which color noise has been reduced as described above is sent to the signal integration processing unit 204 and integrated with the color image data on which the processing to reduce luminance noise has been performed separately.

(Flow of Color Noise Reduction Processing)

Figure 11B:
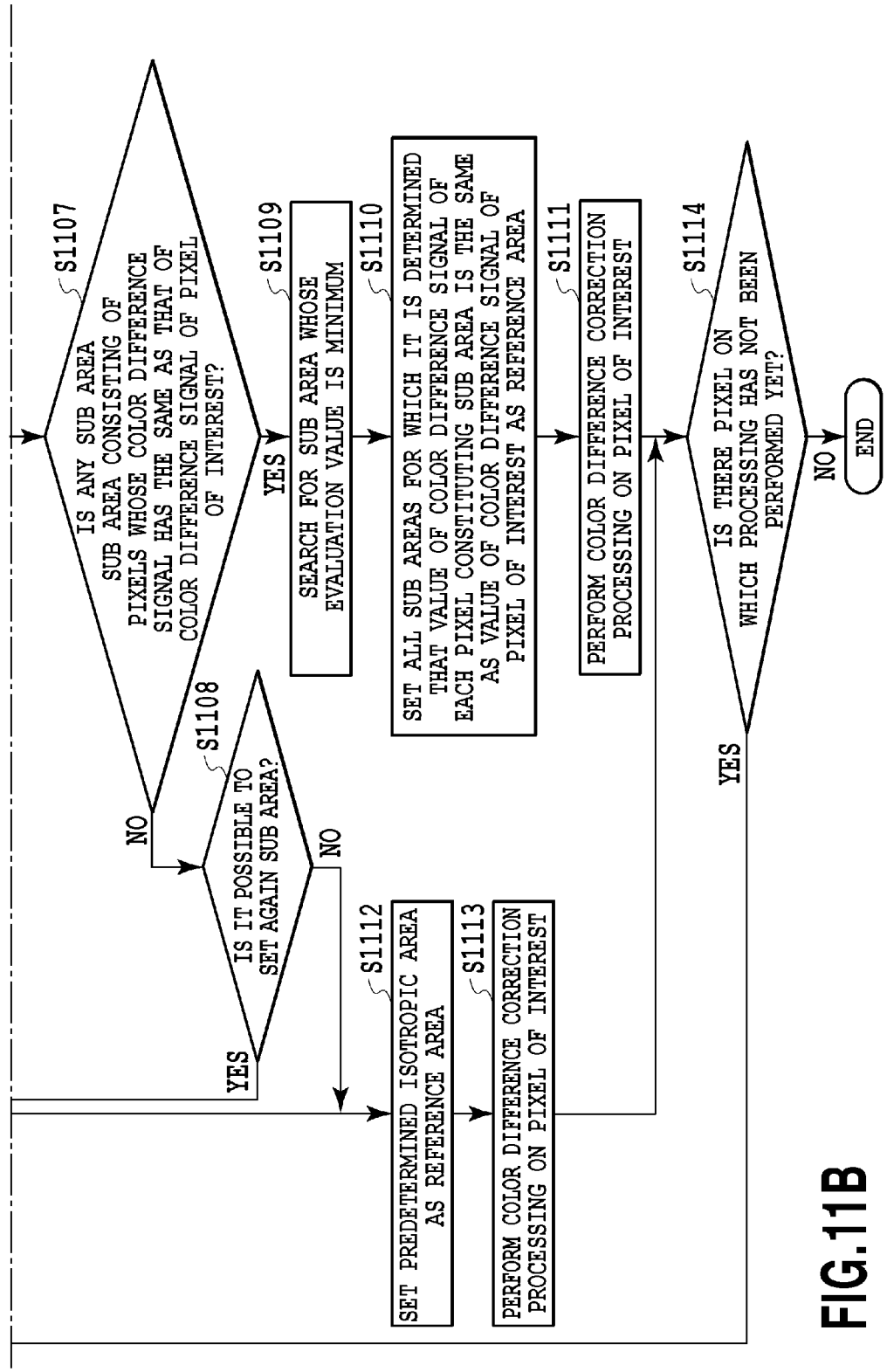
FIG. 11 is a diagram showing a relationship between FIGS. 11A and 11B, and FIGS. 11A and 11B are flowcharts showing a flow of color noise reduction processing.

Subsequently, a flow of the processing in the color noise reduction processing unit 202 is explained. FIGS. 11A and 11B are flowcharts showing a flow of the color noise reduction processing. The series of processing is implemented by the CPU 101 executing the program stored in the HDD 130 after loading the program into the RAM 102.

At step 1101, a pixel of interest is determined from input color image data.

At step 1102, the area setting unit 301 sets an isotropic area (primary area) including the pixel of interest as a color determination area for the determined pixel of interest.

At step 1103, the evaluation value derivation unit 302 derives an evaluation value for the color determination area (primary area) that is set.

At step 1104, the color determination unit 303 determines whether the color difference signal of each pixel within the primary area has the same value as that of the color difference signal of the pixel of interest based on the evaluation value derived for the color determination area (primary area) that is set. In the case where the results of the determination indicate that the color difference signal of each pixel within the primary area has the same value as that of the color difference signal of the pixel of interest, the processing proceeds to step 1112. On the other hand, in the case where there is a pixel whose color difference signal has a value different from that of the color difference signal of the pixel of interest within the primary area, the processing proceeds to step 1105.

At step 1105, the area setting unit 301 sets a combination (set area) of sub areas each having directivity, which is isotropic as a whole, as the color determination area. At this time, the size of the sub area constituting the set area that is set is set so that the size is smaller than that of the sub area at the time of the previous setting.

At step 1106, the evaluation value derivation unit 302 derives an evaluation value for the color determination area that is set. As described above, the set area includes a plurality of sub areas, and therefore, the evaluation value is derived for each color of RGB for each sub area.

At step 1107, the color determination unit 303 determines whether there is a sub area consisting of pixels whose color difference signal has the same value as that of the color difference signal of the pixel of interest based on the evaluation values for each sub area derived at step 1106. In the case where the results of the determination indicate that there is a sub area consisting of pixels whose color difference signal has the same value as that of the color difference signal of the pixel of interest, the processing proceeds to step 1109. On the other hand, in the case where any sub area is not a sub area consisting of pixels whose color difference signal has the same value as that of the color difference signal of the pixel of interest, the processing proceeds to step 1108.

At step 1108, the area setting unit 301 determines whether it is possible to set again the set area, which is the secondary area. In the present embodiment, whether each sub area constituting the set area that is currently set is a one-dimensional area is determined and in the case where the sub area is a one-dimensional area, it is not possible to set the set area of sub areas any more. This determination condition means the shape that the reference area that is used in the color noise reduction processing is allowed to take. Besides the condition that whether each sub area is a one-dimensional area as described above, the condition may be, for example, the number of pixels constituting the sub area. A more appropriate condition may vary depending on the amount of noise of input image data and the resolution-reduction ratio. In the case where the results of the determination indicate that it is possible to set again the set area, which is the secondary area, the processing returns to step 1105, and the set area whose sub area is set to a one step smaller size is set and the processing is continued. On the other hand, in the case where it is not possible to set again the set area any more, which is the secondary area, the processing proceeds to step 1112.

At step 1109, the color determination unit 303 searches for a sub area and the direction thereof, which has the minimum evaluation value, from among the sub areas that are set as the reference area. Due to this, it is possible to implement optimum correction of the color difference in the color correction processing (step 1111), to be described later.

At step 1110, the correction parameter setting unit 304 sets the reference area for the current pixel of interest to an area using all the sub areas determined to have the same color as that of the pixel of interest as a parameter in the color difference correction processing. In other words, the correction parameter setting unit 304 sets all the sub areas for which it is determined that the value of the color difference signal of each pixel constituting the sub area is the same as the value of the color difference signal of the pixel of interest as the reference area for the current pixel of interest.

At step 1111, the color difference correction unit 305 corrects the pixel value of the pixel of interest so that color noise is reduced based on the information on the sub area having the minimum evaluation value that is found at step 1109 and the reference area as the correction parameter that is set at step 1110.

At step 1112, the correction parameter setting unit 304 sets the reference area for the current pixel of interest to a predetermined isotropic area as the correction parameter in the color difference correction processing.

At step 1113, the color difference correction unit 305 corrects the pixel value of the pixel of interest by performing, for example, common smoothing processing, as the color difference correction processing based on the reference area as the correction parameter that is set at step 1112.

At step 1114, whether the processing for the input color image data has been completed is determined. In the case where the results of the determination indicate that there is a pixel on which the processing has not been performed yet, the processing returns to step 1101, and the next pixel is determined to be the pixel of interest and the processing is continued. On the other hand, in the case where the processing for the input color image data has been completed, the present processing is terminated.

The above is the flow of the processing in the color noise reduction processing unit 202.

As to the color determination for the primary area, it may also be possible to use another method in which, for example, a solid color part is determined. In this case, after performing filter processing on image data by using a filter that extracts a common edge intensity, the edge intensity of each pixel included in the primary area is referred to. In the case where the edge intensity of the pixel included in the primary area is less than a predetermined value (flat part), it is determined that the primary area consists of only pixels having substantially the same color as that of the pixel of interest, and the processing proceeds to step 1112. In the case where the edge intensity of the pixel included in the primary area is greater than or equal to a predetermined value, it is sufficient to design the flow so that the processing proceeds to step 1105 because the primary area includes a color edge.

According to the present embodiment, it is possible to set a more appropriate area in which an area in a color different from that of the pixel of interest is not intermingled for each pixel on which attention is focused, and to implement processing to correct a color difference by making use of only the pixels within the optimum area that is set. Due to this, it is possible to reduce color noise without causing color blurring even in the vicinity of an edge.

Second Embodiment

Next, an aspect is explained as a second embodiment, in which the contents of the color difference correction processing itself are set as a correction parameter, in addition to the reference area that is used in the color difference correction processing of the pixel of interest. The second embodiment is the same as the first embodiment except for the contents of the correction parameter that is set by the correction parameter setting unit 304, and therefore, in the following, only different points are explained.

In the correction parameter setting unit 304 according to the present embodiment also, an area that satisfies the color determination condition based on the determination results by the color determination unit 303 is set in principle as a reference area for the pixel of interest. However, in the case where there is not a sub area that satisfies the color determination condition, or in the case where the number of pixels in a sub area that satisfies the color determination condition is less than or equal to a predetermined number, a predetermined isotropic area as a reference area is set. Further, the contents of specific color difference correction processing expressed by expression (16) and expression (17) below are set as a correction parameter.

$$Cr_{result}(i, j) = \frac{\left(\sum_{j=-2}^{2}\sum_{i=-2}^{2}\{k(i, j) * Cr(i, j)\}\right)}{Dev} \quad \text{Expression (16)}$$

$$Cb_{result}(i, j) = \frac{\left(\sum_{j=-2}^{2}\sum_{i=-2}^{2}\{k(i, j) * Cb(i, j)\}\right)}{Dev} \quad \text{Expression (17)}$$

In expression (16) and expression (17) described above, Cr (i, j) and Cb (i, j) each represent a color difference of a certain pixel located at a relative position in the case where the position of the pixel of interest is taken to be reference coordinates (i=0, j=0). Further, k (i, j) is a filter coefficient and the numerical value of each position is determined in advance. Dev is the total sum of the numerical values of the filter coefficient k (i, j). For example, in the case where k (0, 0)=1 and k (i, j)=0 (i≠0, j≠0) are set, the value representing the color difference of the pixel of interest is not corrected and the original results will be output.

FIG. 12 is a diagram explaining the way the pixel value is corrected by using expression (16) and expression (17) described above according to the present embodiment. In the example in FIG. 12, an isotropic area of 5×5 pixels in which i and j take values in a range between 2 and −2, respectively, and in which the pixel of interest is located at the center is taken to be a reference area. Here, the target of correction is the pixel of interest whose Cr value is "−33" and whose Cb value is "−150", and the value of Dev is 74. Then, by using the pixel value of the pixel of interest and each pixel value within the reference area, the corrected values ($Cr_{result}$: 5, $Cb_{result}$: −36) of the values Cr and Cb each representing the color difference in the pixel of interest, which are indicated by reference symbol 1201, are derived in accordance with expression (16) and expression (17) described above. Here, the example is shown in which the size of the isotropic area as the reference area is 5×5 pixels, but the size is not limited to this. Further, as a matter of course, expressions that are set as a correction parameter and which are applied to the pixel of interest are not limited to expression (16) and expression (17) described above.

Third Embodiment

Next, an aspect is explained as a third embodiment, in which a plurality of pieces of image data with different resolutions is generated from input color image data, processing results obtained by performing noise reduction processing on each piece of image data are combined, and final color image data after the noise reduction is output. The basic portions, such as the hardware configuration of the image processing apparatus, are in common to those of the first and second embodiments, and therefore, in the following, different points, i.e., generation processing of a plurality of pieces of image data with different resolutions and combination processing of each piece of image data on which noise reduction processing has been performed are explained mainly.

(Assumption of the Present Embodiment)

It is possible to appropriately remove noise components in accordance with each frequency band by performing noise reduction processing for each frequency band. In order to implement this, it is sufficient to generate band-limited image data by performing multi-resolution conversion on input image data, to perform noise reduction processing on image data with each resolution, and to combine image data with each resolution after noise has been reduced by performing inverse multi-resolution conversion. The inverse multi-resolution conversion corresponds to the multi-resolution conversion, and as a matter of course, it is possible to restore (reversibly or irreversibly) the original signal by performing the inverse multi-resolution conversion. In the case where the band-limited image data is generated by the multi-resolution conversion, it is possible to use a method or the like of converting the input image data into a signal representing the frequency response characteristics for each of the plurality of frequency bands by the Laplacian pyramid decomposition or the wavelet conversion. Then, at the time of performing the inverse multi-resolution conversion, in the case where the band-limited image data is obtained by the Laplacian pyramid decomposition, it is sufficient to use the method of the Laplacian pyramid reconstruction and in the case where the band-limited image data is obtained by the wavelet conversion, it is sufficient to use the inverse wavelet conversion.

Further, by resolution reduction of input image data, the noise suppression effect is obtained for lower-frequency noise even by the noise reduction processing with the same number of filter taps in the case where the number of filter taps that can be designed by hardware is limited. Because of this, this method is effective particularly for color component noise.

In view of the above-described fact, in the present embodiment, first, a plurality of pieces of image data with different resolutions is generated by the multi-resolution conversion and the noise reduction processing is performed on each piece of image data. Then, by combining the image data with each resolution after the noise has been reduced by the inverse multi-resolution conversion, final color image data after the noise reduction is output.

(Logic Configuration of Image Processing Apparatus)

Figure 13:
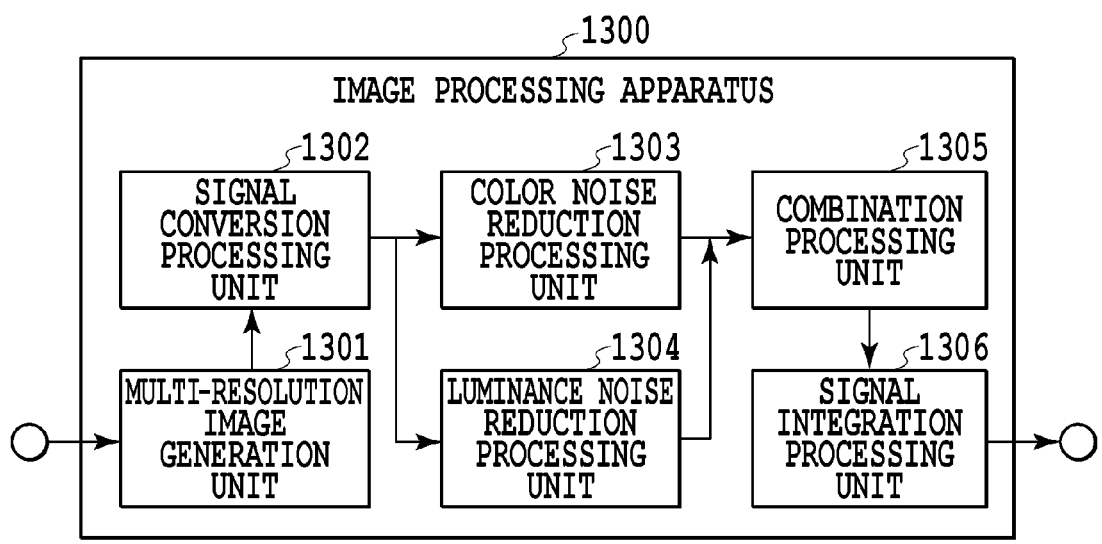
FIG. 13 is a block diagram showing an example of a logic configuration relating to noise reduction processing of an image processing apparatus according to a third embodiment.

FIG. 13 is a block diagram showing an example of a logic configuration relating to noise reduction processing of an image processing apparatus 1300 according to the present embodiment. The image processing apparatus 1300 includes a multi-resolution image generation unit 1301, a signal conversion processing unit 1302, a color noise reduction processing unit 1303, a luminance noise reduction processing unit 1304, a combination processing unit 1305, and a signal integration processing unit 1306.

A color signal (color signal represented in the RGB color space) of color image data that is input from the image capturing device 105, or from the HDD 103 or the external memory 107 is first input to the multi-resolution image generation unit 1301.

Figure 14:
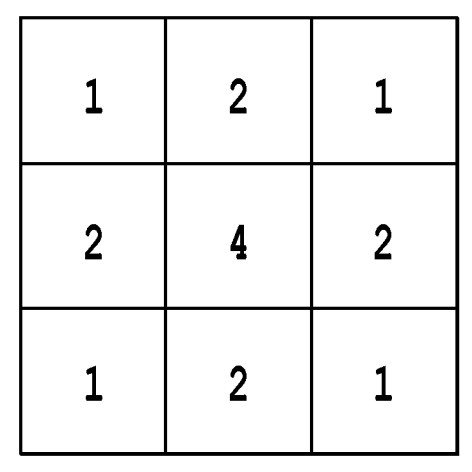

The multi-resolution image generation unit 1301 generates a plurality of pieces of image data with different resolutions from the input color image data. Specifically, the multi-resolution image generation unit 1301 generates resolution-reduced image data with different resolutions (frequency bands), such as image data with a resolution ½ of the original resolution, image data with a resolution ¼ of the original resolution, and so on, by performing the above-described multi-resolution conversion. Hereinafter, a group of a plurality of images with different resolutions generated by the multi-resolution conversion is called "multi-resolution images". It is assumed that the multi-resolution images include the image with the original resolution (1/1 of the original resolution). In order to generate the multi-resolution image data, it is sufficient to use the Laplacian pyramid decomposition or the wavelet conversion as described above. Alternatively, it may also be possible to use thinning processing or the publicly known resolution-reduction algorithm. However, in general, in the case where the resolution of image data is reduced, on a condition that low-pass filter processing is not performed, folding noise occurs and the pattern of the folding noise appears in the corrected image data that is output finally. Consequently, at the time of resolution reduction, it is preferable to apply the bilinear method or the like after using, for example, the average pixel method or another algorithm including low-pass filter processing or performing low-pass filter processing in advance. In this case, the filter that is used in the low-pass filter processing is determined based on the resolution-reduction ratio. FIG. 14 is an example of a filter that is used in the case where the resolution-reduction ratio is ½. The size of the filter and the coefficient are not limited to those in the example in FIG. 14.

The signal conversion processing unit 1302 is basically the same as the signal conversion processing unit 201 of the first embodiment. From the RGB color signals of the input color image data with multiple resolutions, a luminance signal representing the luminance component (Y) and color difference signals representing the color difference components (Cr and Cb) are generated for each pixel with a different resolution by the publicly known conversion formula. The input RGB color signals and the YCrCb color signals for each resolution, which are generated by signal conversion processing, are sent to the color noise reduction processing unit 1303 and the luminance noise reduction processing unit 1304.

The color noise reduction processing unit 1303 performs processing to reduce the noise of the color difference signal for each resolution based on the RGB color signals and the YCrCb signals with each resolution. Details of the color noise reduction processing are as described in the first embodiment.

The luminance noise reduction processing unit 1304 performs processing to reduce the noise of the luminance signal for each resolution. It is sufficient to use common noise reduction processing as the luminance noise reduction processing.

The combination processing unit 1305 enlarges (increases the resolution) and combines the color signal after the color noise reduction for each resolution and the color signal after the luminance noise reduction for each resolution, respectively, so that the images with the original resolution are restored, and outputs the color signal in which the color noise has been reduced and the color signal in which the luminance noise has been reduced. Details of the combination processing will be described later.

The signal integration processing unit 1306 integrates the two kinds of color signals (the color signal in which the color noise has been reduced and the color signal in which the luminance noise has been reduced) that are output from the combination processing unit 1305 and outputs color image data in which both the color noise and the luminance noise have been reduced. The color image data after the integration is output to the monitor 108, the HDD 103, etc. Besides the monitor 108 and the HDD 103, it may also be possible to output the color image data to, for example, the external memory 107 that is connected to the general-purpose I/F 104, the external server, not shown, the printer, etc.

(Details of Combination Processing)

Subsequently, combination processing (processing to enlarge (increase the resolution) and combine the respective color signal after color noise reduction and color signal after luminance noise reduction so that the images with the original resolution are restored) in the combination processing unit 1305 is explained in detail. In the combination processing, a method called alpha blending is used, in which a color signal obtained by increasing the resolution of the color signal in the lower hierarchy and the color signal in the upper hierarchy are combined based on a combination ratio (a value). First, the alpha blending is started from an image with the lowest resolution (image in the lowermost hierarchy). Then, the color signal after the combination, which is obtained by the alpha blending, is increased in the resolution until the resolution of the color signal becomes the same resolution corresponding to the upper hierarchy, and the color signal obtained by the increasing the resolution and the color signal in the upper hierarchy are further alpha-blended based on the combination ratio. The processing such as this is repeated until the image (image with the original resolution (1/1 of the original resolution)) in the uppermost hierarchy is reached. For increasing the resolution at this time, it is sufficient to use, for example, the bilinear method, the nearest neighbor method, the bicubic method, the Lanczos method, etc. In the case where multi-resolution image data is generated by the Laplacian pyramid decomposition or the wavelet conversion, it is sufficient to perform inverse multi-resolution conversion by using the method of Laplacian pyramid reconstruction or the inverse wavelet conversion. In the case where the color signal value on the lower hierarchy side is taken to be $I_{down}$, the color signal value on the upper hierarchy side to be $I_{up}$, the combination ratio to be u, and the color signal value after combination to be $I_{post}$, alpha blending is expressed by expression (18) below.

$$I_{post}=(1-u)I_{down}+uI_{up}\ 0\le u\le 1 \qquad \text{Expression (18)}$$

Here, the combination ratio u represents the extent to which the upper hierarchy side is used and is determined in accordance with the degree of a steep change in the color signal. As an example, a method of finding a combination ratio by performing edge detection using the luminance Y and the color differences Cr and Cb of a pixel of interest as an input is explained. In this method, for example, a spatial filter having a filter coefficient [−1, 2, −1] is used. Among the results of applying the spatial filter such as this in the horizontal direction and in the vertical direction, the results that are thought to have a higher degree of the luminance edge and the color edge are mapped to a coefficient K between 0 and 1 by a function determined in advance. For the results of applying the filter, which are thought to have a higher degree of the luminance edge and the color edge, the coefficient K closer to 1 is output, and for the results of applying the filter, which are thought to have a lower degree, the coefficient K closer to 0 is output. The coefficient K is the combination ratio. It may also be possible to use one of or both the luminance signal and the color difference signal for edge detection. The above-described method of determining the filter coefficient and the combination ratio is merely exemplary and the method is not limited to this. Any determination method may be used as long as it is possible to set a large combination ratio in the case where the degree of the luminance edge and the color edge is thought to be high, and to set a small combination ratio in the case where the degree is thought to be low. Further, it may also be possible to determine combination ratios by different methods and apply the respective combination ratios to the respective color signal after color noise reduction and color signal after luminance noise reduction, or to use the same combination ratio for both.

According to the present embodiment, it is possible to appropriately remove noise components in accordance with a frequency band. Further, it is made possible to obtain the noise suppression effect for lower-frequency noise even by noise reduction processing using the same number of filter taps.

Fourth Embodiment

In the first to third embodiments, an appropriate area in which an area in a color different from that of the pixel of interest is not intermingled is set for each pixel on which attention is focused, and processing to correct a color difference is performed by making use of the pixel within the area that is set. Due to this, color noise is reduced without causing color blurring even in the vicinity of an edge.

However, the amount of noise is very large at the time of high-sensitive photographing, and therefore, there is a case where a sufficient number of pixels that can be used to reduce noise do not exist within the area that is set, in particular, at a high-contrast edge part. In this case, the color noise is left without being reduced sufficiently. Consequently, an aspect is explained as a fourth embodiment, in which the residual noise at the high-contrast part is reduced by applying another noise reduction method for the high-contrast part and replacing the high-contrast part with the results of applying another method.

The basic portions, such as the hardware configuration of the image processing apparatus, are in common to those of the first embodiment, and therefore, in the following, the contents of color noise reduction processing, which are different points, are explained mainly.

(Details of Color Noise Reduction Processing)

Figure 15:
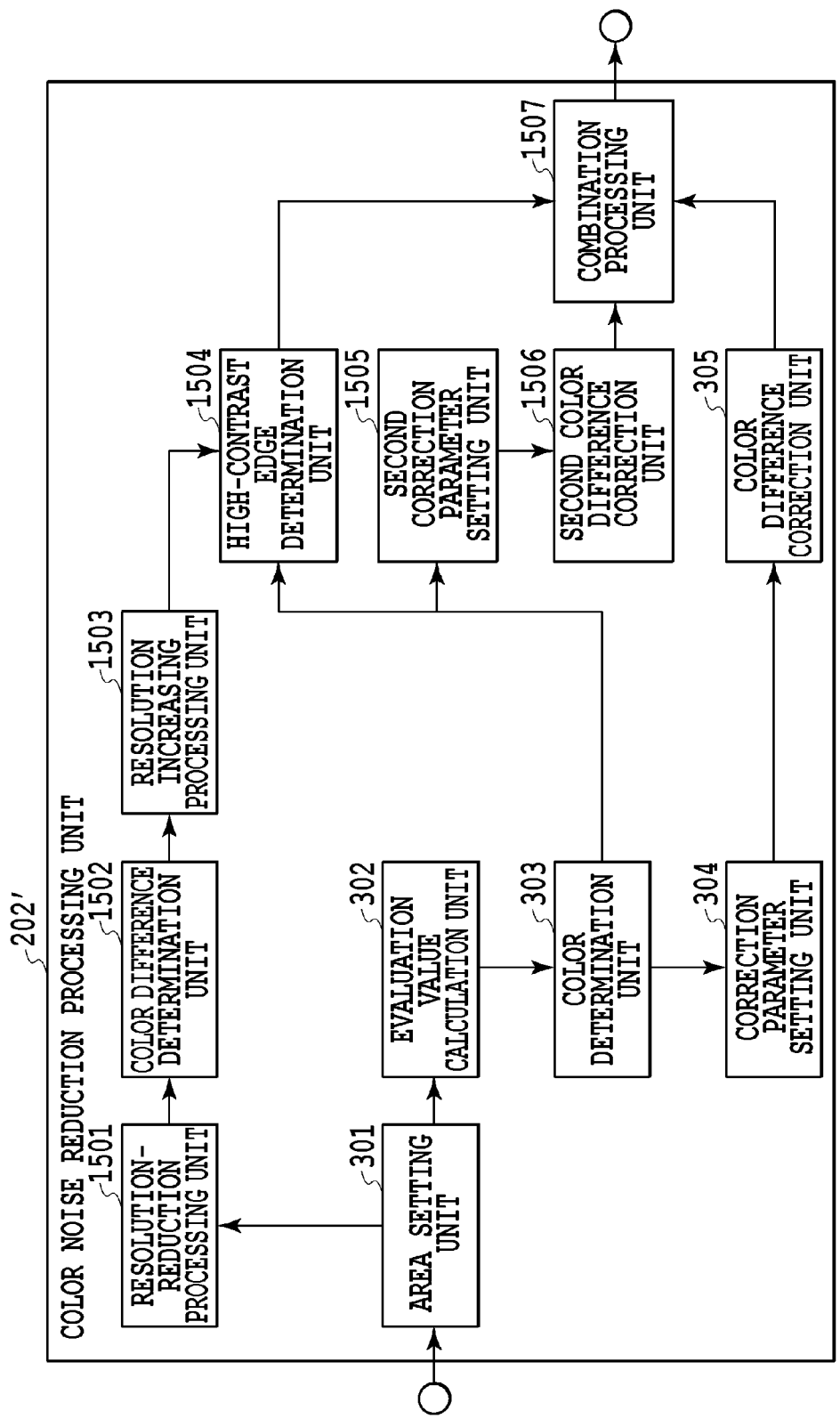
FIG. 15 is a block diagram showing an internal configuration of a color noise reduction processing unit according to a fourth embodiment.

FIG. 15 is a block diagram showing an internal configuration of a color noise reduction processing unit 202' according to the present embodiment. The color noise reduction processing unit 202' shown in FIG. 15 has unique processing units shown below compared to the color noise reduction processing unit 202 of the first embodiment. Specifically, the color noise reduction processing unit 202' has a resolution-reduction processing unit 1501, a color difference determination unit 1502, a resolution increasing processing unit 1503, a high-contrast edge determination unit 1504, a second correction parameter setting unit 1505, a second color difference correction unit 1506, and a combination processing unit 1507. The area setting unit 301, the evaluation value derivation unit 302, the color determination unit 303, the correction parameter setting unit 304, and the color difference correction unit 305 are in common to each processing unit shown in FIG. 2B of the first embodiment. Hereinafter, the processing units unique to the present embodiment are explained.

<Resolution-Reduction Processing Unit>

The resolution-reduction processing unit 1501 reduces the resolution of the RGB color signals of input color image data to signals with a resolution obtained by reducing the original resolution based on a predetermined resolution-reduction ratio (e.g., ½) and generates color difference signals representing color difference components (Cr and Cb) by the publicly known conversion formula. Alternatively, it may also be possible to directly reduce the resolution of the color difference signals CrCb converted by the signal conversion processing unit 201 to signals with a resolution obtained by reducing the original resolution based on a predetermined resolution-reduction ratio. It is sufficient to use the method shown in the third embodiment for the resolution-reduction processing at this time. The purpose of the resolution-reduction processing is to improve determination accuracy by reducing noise. Consequently, any predetermined resolution-reduction ratio may be used as long as the purpose can be attained, and the predetermined resolution-reduction ratio does not necessarily need to be ½. Further, it may also be possible to apply noise reduction processing in place of the resolution-reduction processing. The results of the resolution-reduction processing are stored in the RAM 102 so as to be used in the next color difference determination processing.

<Color Difference Determination Unit>

Figure 16:
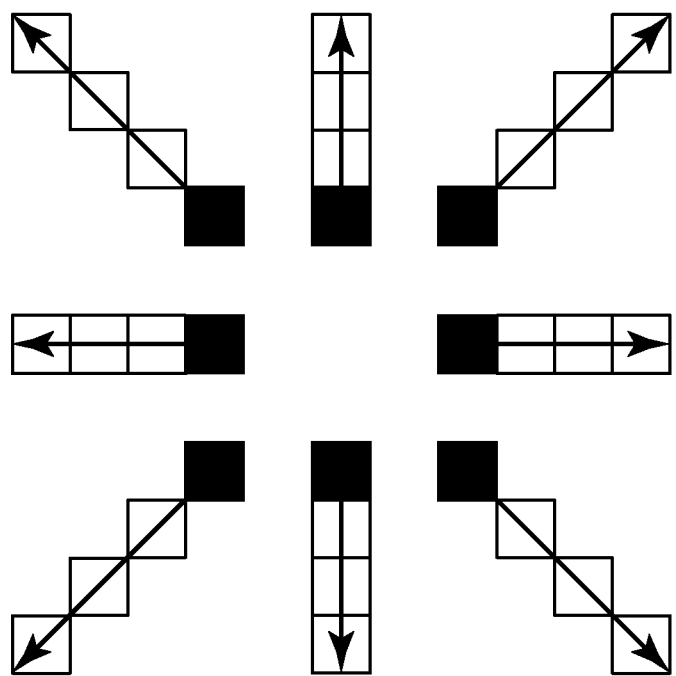
FIG. 16 is a diagram showing an example of a set area that is set by a color difference determination unit according to the fourth embodiment.

The color difference determination unit 1502 determines whether there exists a uniform direction in the color difference signal of the pixel of interest for each pixel, and determines whether the pixel of interest is a pixel constituting an edge. Specifically, an evaluation value is calculated by using the color difference signal in a one-dimensional set area as shown in FIG. 16 and in the case where a uniform direction exists in the color difference signal of the pixel of interest based on the calculated evaluation value, it is determined that the pixel of interest is an edge. The number of pixels and the shape of the sub area constituting the set area that is used to calculate an evaluation value are not limited to those in the example in FIG. 16 and it is only required that the set area be one-dimensional.

It is possible to calculate the evaluation value here by applying the values of the color difference signals Cr and Cb in each sub area to the pixel value $x_i$ in expression (1) or expression (2) explained in <Evaluation value derivation unit> of the first embodiment. For example, in the case where expression (1) is used, among the sub areas constituting the set area, a sub area for which the total value score expressed in expression (19) below becomes the minimum (sub area that satisfies expression (20) below) is found.

$$\text{score} = \sigma'^2_{Cr} + \sigma'^2_{Cb} \qquad \text{Expression (19)}$$

$$\text{score} = \text{Min}\{\text{score}|\text{score} \in S\} \qquad \text{Expression (20)}$$

Then, in the case where the total value score satisfies conditions expressed by expression (21) and expression (22) below, it is determined that a uniform direction exists in the color difference signal of the pixel of interest, i.e., the pixel of interest is an edge.

$$\text{score}_{min} < th_g \qquad \text{Expression (21)}$$

$$th_g = ud + e \qquad \text{Expression (22)}$$

In the case where expression (2) is used to calculate the evaluation value, determination is performed by using expression (23), expression (24), expression (25), and expression (26) below, in place of expression (19), expression (20), expression (21), and expression (22) described above.

$$\text{score}' = \sigma'_{Cr} + \sigma'_{Cb} \qquad \text{Expression (23)}$$

$$\text{score}'_{min} = \text{Min}\{\text{score}'|\text{score}' \in S\} \qquad \text{Expression (24)}$$

$$\text{score}'_{min} < th'_g \qquad \text{Expression (25)}$$

$$th'_g = \sqrt{u}d' + e' \qquad \text{Expression (26)}$$

Here, in expression (22) and expression (26) described above, u is the pixel value of the G component of the pixel of interest and e an e' are coefficients. It is preferable for the coefficients e and e' in this case to be changed in accordance with the amount of noise in image data that is input. For example, it is sufficient to set the coefficients e and e' in advance in accordance with the photographing sensitivity or the like of the image capturing device 105 so that a small value is set in the case where the amount of noise is small and a large value is set in the case where the amount of noise is large.

The results of the color difference determination for each pixel, which are obtained as described above, are stored in the RAM 102, for example, in such a manner that "1" is stored as a flag value for the pixel determined to be an edge and "0" is stored for the pixel determined be a non-edge.

<Resolution-Increasing Processing Unit>

The resolution-increasing (enlargement) processing unit 1503 increases the resolution of the results of the color difference determination, which are obtained by the color difference determination unit 1502, so that the resolution of the image data becomes the same resolution as that of the input image data (doubled in the case where the resolution is reduced to ½). For increasing the resolution, it is sufficient to use, for example, the bilinear method, the nearest neighbor method, the bicubic method, the Lanczos method, etc. The results of the color difference determination by increasing the resolution so that the original resolution is restored are stored in the RAM 102 as a color difference determination map (edge determination map). As a matter of course, in the case where the resolution is not reduced by the resolution-reduction processing unit 1501, it is not necessary to increase the resolution of the results.

<High-Contrast Edge Determination Unit>

The high-contrast edge determination unit 1504 performs processing to determine whether or not the pixel of interest is a high-contrast edge (high-contrast edge determination processing) based on the color difference determination map obtained by the resolution increasing processing unit 1503 and the results of the color determination obtained by the color determination unit 303. Specifically, in the case where the results of the color determination by the color determination unit 303 indicate that the periphery of the pixel of interest is a high-contrast area and the color difference determination map indicates that the pixel of interest is an edge, the pixel of interest is determined to be a high-contrast edge.

The color difference determination and the color difference determination map (edge determination map), which is the results of the color difference determination, are as described above, and here, determination of whether the periphery of the pixel of interest is a high-contrast area is explained. In the color determination by the color determination unit 303, as explained in the first embodiment, whether the area (the primary area or the secondary area)

that is set by the area setting unit 301 is the area consisting of pixels whose color difference signal has the same value as that of the color difference signal of the pixel of interest is determined based on the evaluation value. In the color noise reduction processing flow (see FIGS. 11A and 11B) of the first embodiment, first, the color determination is performed based on the evaluation value derived for the primary area (step 1104). Then, in the case where it is determined that there is a pixel having a color difference signal whose value is different from that of the color difference signal of the pixel of interest within the primary area as a result, next, the secondary area is set and the color determination is performed (step 1105 to step 1107). In the case where the results of the color determination based on the secondary area indicate that none of the sub areas is a sub area consisting of pixels whose color difference signal has the same value as that of the color difference signal of the pixel of interest (No at step 1107), the secondary area is set again and the color determination is performed (Yes at step 1108). The secondary area is set again so that the size of the sub area constituting the set area is smaller than the size of the sub area at the time of the previous setting. Then, the sub area is set again repeatedly until the sub area becomes a one-dimensional area (until the sub area reaches a shape for which the sub area cannot be set again any more), or until other conditions are satisfied. In the present embodiment, whether the results of the color determination thus obtained do not satisfy the condition expressed in expression (3) described previously in the stage of the primary area is checked. The reason is that the case where the results of the color determination indicate that the condition in expression (3) described previously is not satisfied in the stage of the primary area means that the area is a high-contrast area. Further, it may also be possible to check whether the results of the color determination indicate that the condition in expression (3) described previously is not satisfied in the stage of the primary area, and the condition in expression (3) described previously is satisfied in the stage of the secondary area and also in the stage of the sub area having a specific size.

As described above, in the high-contrast edge determination processing, it is determined that the pixel of interest is a high-contrast edge only in the case where the results of the color determination determine that the periphery of the pixel of interest is a high-contrast area and the color difference determination map determines that the pixel of interest is an edge for each pixel. Then, the results of the high-contrast edge determination processing that is performed for each pixel are stored in the RAM 102 as a high-contrast edge determination map in which, for example, "1" is set for the pixel determined to be a high-contrast edge and "0" is set for the other pixels.

<Second Correction Parameter Setting Unit>

The second correction parameter setting unit 1505 sets a parameter (hereinafter, referred to as a "second correction parameter") that enhances the color noise reduction effect for a correction parameter (hereinafter, referred to as a "first correction parameter") that is set by the correction parameter setting unit 304. In order to enhance the color noise reduction effect, it is sufficient to, for example, set the reference area so as to be larger than the reference area of the first correction parameter. Here, in the case where implementation by means of hardware is supposed, it is desirable to reduce the number of filter taps as small as possible. In this case, it may also be possible to generate image data whose resolution is reduced without changing the size of the reference area. By using a resolution-reduced image, it is made possible to obtain the noise suppression effect for the lower-frequency noise by the noise reduction processing with the same number of filter taps.

<Second Color Difference Correction Unit>

The second color difference correction unit 1506 performs color difference correction processing based on the second correction parameter that is set by the second correction parameter setting unit 1505. The color difference correction processing here is as explained in the first embodiment (see the contents of the color difference correction processing by the color difference correction unit 305).

<Combination Processing Unit>

The combination processing unit 1507 performs processing to combine the color difference signal obtained by the color difference correction unit 305 and the color difference signal obtained by the second color difference correction unit 1506 (correction results combination processing) based on the high-contrast edge determination map. A color difference signal value $I_3$ after the combination is expressed by expression (27) below in the case where the color difference signal value obtained by the color difference correction unit 305 is taken to be $I_1$, the color difference signal value obtained by the second color difference correction unit 1506 to be $I_2$, and the results of the high-contrast edge determination (value of the high-contrast edge determination map described above) to be u.

$$I_3 = \begin{cases} I_2 & \text{if } (u = 1) \\ I_1 & \text{else} \end{cases} \qquad \text{Expression (27)}$$

Expression (27) described above expresses that the color difference signal value of the second color difference correction unit 1506 is output as the color difference signal value after the combination for the pixel determined to be a high-contrast edge and the color difference signal value of the color difference correction unit 305 is output as the color difference signal value after the combination for the other pixels. In other words, the high-contrast edge part is replaced with the results of performing the color difference correction processing with a higher noise reduction effect. The color image data in which the color noise has been reduced as described above is sent to the signal integration processing unit 204 and is integrated with the color image data on which the luminance noise reduction processing has been performed separately.

According to the present embodiment, it is possible to reduce the residual noise at the high-contrast edge part.

Other Embodiments

In the first to fourth embodiments, the examples in which the processing is performed by the image processing application are explained, but these may be methods of performing processing on the data of the image photographed by the image capturing device on the image processing hardware within the image capturing device. In this case, each configuration shown in FIG. 2 is implemented as a circuit. Further, the image data may be processed on the server device by transmitting the image data to the image processing application on the server device from the client device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is made possible to reduce color noise while suppressing color blurring in the vicinity of an edge.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-041432 filed Mar. 3, 2015, and No. 2015-240404 filed Dec. 9, 2015, which are hereby incorporated by reference wherein in their entirety.

What is claimed is:

1. An image processing apparatus comprising:
at least one of:
one or more circuits; or
one or more processors and at least one memory, the at least one memory being coupled to the one or more processors and having stored thereon instructions executable by the one or more processors,
wherein at least one of the one or more circuits or the execution of the instructions cause the image processing apparatus to function as:
a first determination unit configured to determine whether or not a first area consisting of a plurality of pixels including a pixel of interest is an area in a uniform color for the pixel of interest in input image data;
a second determination unit configured to determine whether or not a second area, different from the first area, consisting of a plurality of pixels including the pixel of interest is an area in a uniform color;
a setting unit configured to set a reference area consisting of the pixel of interest and adjacent pixels of the pixel of interest for the pixel of interest; and
a first correction unit configured to correct the pixel value of the pixel of interest to a value for which noise has been reduced based on the pixel values of the pixels included in the reference area,
wherein the setting unit sets:
a predetermined area prepared in advance and consisting of a plurality of pixels as the reference area in a case where the first determination unit determines that the first area is an area in a uniform color; and
an area consisting of a plurality of pixels in accordance with determination results by the second determination unit as the reference area in a case where the first determination unit determines that the first area is not an area in a uniform color.

2. The image processing apparatus according to claim 1, wherein the at least one of the one or more circuits or the execution of the instructions cause:
the second determination unit to perform determination for the second area only in the case where the first determination unit determines that the first area is not an area in a uniform color.

3. The image processing apparatus according to claim 1, wherein
the second area is an area including a plurality of sub areas, the shape of each sub area having directivity, and a combination of all sub areas being isotropic.

4. The image processing apparatus according to claim 3, wherein the at least one of the one or more circuits or the execution of the instructions cause:
the second determination unit to perform the determination by stepwise reducing the size of each sub area in the area, as the second area, including the plurality of sub areas.

5. The image processing apparatus according to claim 4, wherein the at least one of the one or more circuits or the execution of the instructions cause:
the second determination unit to not perform the determination in a case where each sub area becomes a one-dimensional area or in a case where the number of pixels constituting each sub area becomes less than or equal to a predetermined number.

6. The image processing apparatus according to claim 3, wherein the at least one of the one or more circuits or the execution of the instructions cause:
the setting unit to set an area consisting of at least the pixels of the predetermine area as the reference area in a case where the second determination unit determines that there is not an area in a uniform color in any of sub areas included in the second area.

7. The image processing apparatus according to claim 3, wherein the at least one of the one or more circuits or the execution of the instructions cause:
the setting unit to set all sub areas determined to be an area in a uniform color by the second determination unit as an area consisting of a plurality of pixels in accordance with determination results by the second determination unit.

8. The image processing apparatus according to claim 3, the at least one of the one or more circuits or the execution of the instructions cause the image processing apparatus to function as:
a unit configured to set the contents of specific correction processing based on the number of pixels constituting a sub area determined to be an area in a uniform color by the second determination unit, wherein
the first correction unit corrects the pixel value of the pixel of interest to a value for which noise has been reduced in accordance with the contents of the specific correction processing that are set.

9. The image processing apparatus according to claim 3, the at least one of the one or more circuits or the execution of the instructions cause the image processing apparatus to function as:
a unit configured to set the contents of specific correction processing in a case the results of determination by the second determination unit indicate that there is not a sub area determined to be an area in a uniform color, wherein
the first correction unit corrects the pixel value of the pixel of interest to a value for which noise has been reduced in accordance with the contents of the specific correction processing that are set.

10. The image processing apparatus according to claim 1, wherein the at least one of the one or more circuits or the execution of the instructions cause:
the first determination unit to perform the determination by using an evaluation value representing a degree of uniformity of the color, which is calculated based on a difference between the pixel of interest and each pixel constituting the first area.

11. The image processing apparatus according to claim 10, wherein
the evaluation value is found by using an expression below $$\sigma' = \frac{1}{N-1}\sum_{i=1}^{N}|x_i - u|,$$

and
in the above-described expression, N is the number of pixels constituting the first area, $x_i$ is the pixel value of each pixel constituting the first area, and u is the pixel value of the pixel of interest.

12. The image processing apparatus according to claim 1, wherein the at least one of the one or more circuits or the execution of the instructions cause the image processing apparatus to function as:
a conversion unit configured to convert image data, which is the input image data, corresponding to a plurality of color components into image data including a color difference signal, wherein
the first determination unit and the second determination unit perform the determination, respectively, based on image data before being converted by the conversion unit, and the setting unit and the first correction unit perform the setting and the correction, respectively, based on image data after being converted by the conversion unit.

13. The image processing apparatus according to claim 1, wherein
a plurality of pieces of image data with different resolutions is generated by performing multi-resolution conversion on the input image data,
the first and second determination units, the setting unit, and the first correction unit perform each piece of processing on image data with each resolution, and
image data with the original resolution is generated by performing inverse multi-resolution conversion on image data with each resolution in which noise has been reduced by correction by the first correction unit.

14. The image processing apparatus according to claim 1, the at least one of the one or more circuits or the execution of the instructions cause the image processing apparatus to function as:

a second correction unit configured to perform correction processing with a noise reduction effect more significant than that of the correction by the first correction unit on the pixel of interest in a case where the first area is a high-contrast area having a high contrast and the pixel of interest is a pixel constituting an edge.

15. The image processing apparatus according to claim 14, the at least one of the one or more circuits or the execution of the instructions cause the image processing apparatus to function as:
a correction results combination unit configured to output the results of correction by the second correction unit in a case where the pixel of interest in the input image data is a pixel in the high-contrast area and is a pixel constituting the edge, and to output the results of correction by the first correction unit in a case where the pixel of interest in the input image data is a pixel in the high contrast area and is not a pixel constituting the edge.

16. The image processing apparatus according to claim 15, the at least one of the one or more circuits or the execution of the instructions cause the image processing apparatus to function as:
a determination unit configured to determine whether the first area is the high-contrast area by using an evaluation value representing a degree of uniformity of a color difference signal, which is calculated based on a difference in the color difference signal between the pixel of interest and each pixel constituting the first area.

17. The image processing apparatus according to claim 16, wherein
the evaluation value is found by using expression below $$\sigma' = \frac{1}{N-1}\sum_{i=1}^{N}|x_i - u|,$$

and
in the above-described expression, N is the number of pixels constituting the first area, $x_i$ is the pixel value of each pixel constituting the first area, and u is the pixel value of the pixel of interest.

18. An image processing method comprising:
a first determination step of determining whether or not a first area consisting of a plurality of pixels including a pixel of interest is an area in a uniform color for the pixel of interest in input image data;
a second determination step of determining whether or not a second area, different from the first area, consisting of a plurality of pixels including the pixel of interest is an area in a uniform color;
a setting step of setting a reference area consisting of the pixel of interest and adjacent pixels of the pixel of interest for the pixel of interest; and
a correction step of correcting the pixel value of the pixel of interest to a value for which noise has been reduced based on the pixel values of the pixels included in the reference area, wherein
in the setting step, a predetermined area prepared in advance and consisting of a plurality of pixels is set as the reference area in a case where the first area is determined to be an area in a uniform color in the first determination step, and an area consisting of a plurality of pixels in accordance with determination results in the second determination step is set as the reference area in a case where the first area is determined not to be an area in a uniform color in the first determination step.

19. A non-transitory computer readable storage medium storing a program for causing a computer to perform an image processing method comprising:
   a first determination step of determining whether or not a first area consisting of a plurality of pixels including a pixel of interest is an area in a uniform color for the pixel of interest in input image data;
   a second determination step of determining whether or not a second area, different from the first area, consisting of a plurality of pixels including the pixel of interest is an area in a uniform color;
   a setting step of setting a reference area consisting of the pixel of interest and adjacent pixels of the pixel of interest for the pixel of interest; and
   a correction step of correcting the pixel value of the pixel of interest to a value for which noise has been reduced based on the pixel values of the pixels included in the reference area, wherein
   in the setting step, a predetermined area prepared in advance and consisting of a plurality of pixels is set as the reference area in a case where the first area is determined to be an area in a uniform color in the first determination step, and an area consisting of a plurality of pixels in accordance with determination results in the second determination step is set as the reference area in a case where the first area is determined not to be an area in a uniform color in the first determination step.

* * * * *